(12) United States Patent
Ängeby

(10) Patent No.: US 10,466,129 B2
(45) Date of Patent: Nov. 5, 2019

(54) MEASUREMENT OF KNOCK INTENSITY

(71) Applicant: SEM AB, Åmål (SE)

(72) Inventor: Jakob Olofsson Ängeby, Karlstad (SE)

(*) Notice: Subject to any disclaimer, the term of this patent is extended or adjusted under 35 U.S.C. 154(b) by 590 days.

(21) Appl. No.: 15/037,685

(22) PCT Filed: Nov. 24, 2014

(86) PCT No.: PCT/EP2014/075403
§ 371 (c)(1),
(2) Date: May 19, 2016

(87) PCT Pub. No.: WO2015/075230
PCT Pub. Date: May 28, 2015

(65) Prior Publication Data
US 2016/0305841 A1 Oct. 20, 2016

Related U.S. Application Data

(60) Provisional application No. 61/908,189, filed on Nov. 25, 2013.

(51) Int. Cl.
*G01L 23/22* (2006.01)
*F02D 35/02* (2006.01)
(Continued)

(52) U.S. Cl.
CPC .......... *G01L 23/221* (2013.01); *F02D 35/027* (2013.01); *F02D 41/0002* (2013.01);
(Continued)

(58) Field of Classification Search
CPC . G01L 23/221; G01L 23/227; F02D 41/2406; F02D 41/30; F02D 41/26;
(Continued)

(56) References Cited

U.S. PATENT DOCUMENTS 6,336,355 B1 * 1/2002 Sasaki ............... F02B 77/08
73/114.39
6,945,229 B1 9/2005 Zhu et al.
(Continued)

FOREIGN PATENT DOCUMENTS

JP 2007009735 A * 1/2007 ............ F02D 35/027
JP 2009215908 A * 9/2009 ......... F02D 41/3094
(Continued)

OTHER PUBLICATIONS

U.S. Appl. No. 15/037,685, filed May 19, 2016, Ängeby.
(Continued)

*Primary Examiner* — Joseph J Dallo
(74) *Attorney, Agent, or Firm* — Bresbo AB

(57) ABSTRACT

A computer-implemented platform may comprise hardware and software configured to estimate knock intensity and/or manage an engine using knock intensity data. A plurality of knock indicators may be used to model a knock response, providing an improved estimate of knock intensity. Knock intensities from a plurality of combustion cycles may be used to estimate a statistical distribution of knock intensities. The statistical distribution may be used to determine an engine tune state. An engine tune state may be modified via the incorporation of prior knock intensity statistics.

20 Claims, 10 Drawing Sheets

(51) Int. Cl.
| | |
|---|---|
| *F02D 41/00* | (2006.01) |
| *F02D 41/24* | (2006.01) |
| *F02D 41/26* | (2006.01) |
| *F02D 41/30* | (2006.01) |
| *F02D 41/28* | (2006.01) |

(52) U.S. Cl.
CPC ......... *F02D 41/2406* (2013.01); *F02D 41/26* (2013.01); *F02D 41/30* (2013.01); *G01L 23/227* (2013.01); *F02D 2041/001* (2013.01); *F02D 2041/0015* (2013.01); *F02D 2041/285* (2013.01); *F02D 2041/286* (2013.01); *F02D 2041/288* (2013.01); *F02D 2400/08* (2013.01)

(58) Field of Classification Search
CPC ............... F02D 41/0002; F02D 35/027; F02D 2041/0015; F02D 2041/001; F02D 2041/286; F02D 2400/08; F02D 2041/285; F02D 2041/288
See application file for complete search history.

(56) References Cited

U.S. PATENT DOCUMENTS

| | | | |
|---|---|---|---|
| 9,593,631 B2* | 3/2017 | Batal | F02D 35/027 |
| 2007/0067091 A1 | 3/2007 | Takemura et al. | |
| 2008/0276689 A1 | 11/2008 | Tanaya et al. | |
| 2009/0118989 A1* | 5/2009 | Padhi | G01L 23/225 |
| | | | 701/111 |
| 2010/0174472 A1 | 7/2010 | Matsushima et al. | |
| 2011/0036147 A1* | 2/2011 | Huber | G01N 33/2817 |
| | | | 73/35.12 |
| 2011/0146384 A1* | 6/2011 | Kaneko | G01L 23/225 |
| | | | 73/35.09 |
| 2016/0281617 A1* | 9/2016 | Batal | F02D 35/027 |

FOREIGN PATENT DOCUMENTS

| | | |
|---|---|---|
| KR | 20030039494 A * | 5/2003 |
| WO | WO 2007/072207 A2 | 6/2007 |
| WO | WO 2009/031378 A1 | 3/2009 |
| WO | WO 20089/031378 A1 | 3/2009 |

OTHER PUBLICATIONS

U.S. Appl. No. 15/037,686, filed May 19, 2016, Ängeby.
U.S. Appl. No. 14/371,643, filed Jan. 30, 2013, Ängeby.
U.S. Appl. No. 14/371,643.
International Search Report and Written Opinion prepared by European Patent Office for related PCT application No. PCT/EP2014/075403.
International Search Report and Written Opinion prepared by European Patent Office for related PCT application No. PCT/EP2014/75417.
Response to ISR/WO (claims and arguments) filed with entry into National Phase in copending European Patent Application No. 14805535.3, which is the national stage of PCT/EP2014/075403.
Response to ISR/WO (claims and arguments) filed with entry into National Phase in copending European Patent Application No. 14808874.3 , which is the national stage of PCT/EP2014/075417.
Response to Feb. 2019 Office Action issued by the European Patent Office in copending European Patent Application No. 14 805 535.3 (Meas. Knock Intensity).
Response to Feb. 2019 Office Action issued by the European Patent Office in copending European Patent Application No. 14 808 874.3 (Engine Mgmt.).
Response to Feb. 2019 Office action issued by SIPO in copending Chinese patent application 201480074012.7 (Meas. Knock. Int. ).
Response to Feb. 2019 Office action issued by SIPO in copending Chinese patent application (Eng. Mgmt.) 201480074011.2.
Office action issued by SIPO in copending Chinese patent application (Eng. Mgmt.) 201480074011.2.
Translation of summary of office action issued by SIPO in copending Chinese patent application 201480074011.2 (Eng. Mgmt.).
Unofficial translation of substantive office action issued by SIPO in copending Chinese patent application (Eng. Mgmt.) 201480074011.2.
Response to Chinese office action in copending Chinese patent application 201480074011.2.
Translation of claims filed in response to Chinese office action in copending Chinese patent application 201480074011.2.
Office action issued by SIPO in copending Chinese patent application 201480074012.7 (Meas. Knock. Int. ).
Translation of summary of office action issued by SIPO in copending Chinese patent application 201480074012.7 (Meas. Knock. Int. ).
Unofficial translation of office action issued by SIPO in copending Chinese patent application 201480074012.7 (Meas. Knock. Int. ).
Response to Chinese office action in copending Chinese patent application 201480074012.7 (Meas. Knock. Int.).
Translation of claims filed in response to Chinese office action in copending Chinese patent application201480074012.7 (Meas. Knock. Int.).
Feb. 2019 Office action issued by SIPO in copending Chinese patent application 201480074012.7 (Meas. Knock. Int. ).
Feb. 2019 Translation of summary of office action issued by SIPO in copending Chinese patent application 201480074012.7 (Meas. Knock. Int. ).
Feb. 2019 Unofficial translation of office action issued by SIPO in copending Chinese patent application 201480074012.7 (Meas. Knock. Int. ).
Feb. 2019 Office action issued by SIPO in copending Chinese patent application (Eng. Mgmt.) 201480074011.2.
Feb. 2019 Translation of summary of office action issued by SIPO in copending Chinese patent application 201480074011.2 (Eng. Mgmt.).
Feb. 2019 Unofficial translation of substantive office action issued by SIPO in copending Chinese patent application (Eng. Mgmt.) 201480074011.2.
Feb. 2019 Office Action issued by the European Patent Office in copending European Patent Application No. 14 805 535.3 (Meas. Knock Intensity).
Feb. 2019 Office Action issued by the European Patent Office in copending European Patent Application No. 14 808 874.3 (Engine Mgmt.).

* cited by examiner

MEASUREMENT OF KNOCK INTENSITY

CROSS REFERENCE TO RELATED APPLICATIONS

The present application is the 35 USC § 371 National Stage of international patent application no. PCT/EP2014/075403, filed Nov. 24, 2014, which claims the priority benefit of U.S. Provisional Patent Application No. 61/908,189, filed Nov. 25, 2013. The present application is related to U.S. patent application Ser. No. 15/037,686, now U.S. Pat. No. 9,945,751, which is the 371(c) National Stage of international patent application no. PCT/EP2014/075417, filed Nov. 24, 2014, which also claims the priority benefit of U.S. Provisional Patent Application No. 61/908,189, filed Nov. 25, 2013.

1. TECHNICAL FIELD

The present invention relates generally to engine management, and more particularly to measuring knocking.

DESCRIPTION OF RELATED ART

Optimal engine performance typically requires a combination of conflicting requirements. High output (e.g., high torque, power, and efficiency, low emissions and low fuel consumption) are desired, but not to the extent of damaging or otherwise degrading the engine, environment, and/or users. An optimum combination of output and safety often requires finding an appropriate "middle ground" between "low output but safe" and "high output but damaging."

An engine operating condition (e.g., load, speed, BMEP, boost, fuel/air ratio, ignition timing, injection timing, compression ratio, and the like) may affect performance. Within an operating condition, safe operation is typically associated with controlled combustion (e.g., from a combustion front ignited by a spark plug or a fuel injection). A "high output" operating condition often increases the likelihood of uncontrolled combustion, which may be damaging.

Knocking (or pinging, pinking, detonation), is combustion event in which an uncontrolled explosion occurs within the cylinder. Typically knocking comprises an instantaneous, explosive ignition of a pocket of fuel/air mixture outside of the controlled combustion zone (e.g., ahead of the flame front). A local shockwave is created around the pocket and the cylinder pressure may rise sharply. In extreme cases, engine parts can be damaged or destroyed.

There is a degree of variability associated with combustion, which may result in a range of "intensities" for a knocking event. A "low" or "mild" knock may not be harmful, while a "high" or "harsh" knock may cause damage. Knocking at least partially results from a stochastic or otherwise random influences on an otherwise normally operating engine. As such, engine operation typically yields a range of intensities of knocking events. Detecting a rarely occurring event (e.g., a harsh knock during an otherwise normal operation) may present challenges for engine management.

Detecting and characterizing knocking may be challenging, and may limit the ability to balance engine performance vs. safety. If knocking is not detected and/or (if the engine is knocking) appropriate control action not taken to move away from a harmful knocking condition, the engine may be damaged. However, if the engine is operated too "safely" (e.g., too far away from a condition where knocking becomes harmful), engine performance may decrease, fuel consumption may increase, and/or emissions may increase.

In conventional knock detection, a single sensor provides a single measurement, which is compared to a threshold. If the measured value is larger than a threshold a knocking condition is indicated, and engine performance is reduced to eliminate the knocking. However, such systems and methods do not fully characterize combustion. As a result, the engine is operated in a suboptimal condition (e.g., in a "too safe" condition, with reduced performance and increased emissions, or a "too high performance" condition that can result in damage). An improved knock detection and engine management system would enable higher performance and lower emissions, yet still protect the engine from damage.

SUMMARY OF THE INVENTION

Various aspects provide a system and method for monitoring knock intensity in a cylinder of a combustion engine. A benchmark engine may be used to create a proxy for a reference sensor, using data generated by a "production" or "operation" sensor (hereinafter: opsensor) suitable for mass production. A "production" engine, not having the reference sensor, may include the opsensor, whose data may be used to calculate knock intensity during operation.

A platform comprising computer hardware and software, in communication with a production engine may use data generated by the opsensor to calculate knock intensity within a cylinder. The platform may be in communication with an engine having at least one cylinder configured to combust a fuel in a combustion cycle (k) and an opsensor configured to measure knock data. The engine may be controlled by an engine control system, which may be in communication with the platform. The platform may receive opsensor data from the opsensor and calculate a proxy for knock intensity calculated using a reference sensor.

The platform may comprise computing hardware including a computer readable, non transitory storage medium coupled to a processor and a memory, the processor configured to communicate with an opsensor and an engine control system, the opsensor configured to sense knocking within a cylinder of an engine during a combustion cycle (k), the engine control system configured to operate the engine, the storage medium having embodied thereon instructions executable by the processor to perform a method stored in the memory. The method may comprise selecting a bandset (k) associated with the combustion cycle (k), the bandset(k) comprising two or more bands of knock intensity, each band of knock intensity defining a magnitude of knock intensity, receiving opsensor data from the opsensor for combustion cycle (k), calculating one or more knock indicators y(i,k) from the received opsensor data, calculating a bandchoice (k), the bandchoice(k) identifying the band in the bandset(k) that is likely to have resulted in the y(i,k), and storing the bandchoice(k) and optionally other data (e.g., y(i,k)). A single y(i,k) may be calculated. Two or more, preferably three or more y(i,k) may be calculated for a given combustion cycle (k). In some cases, a plurality of y(i,k) are calculated from a single sensor for a given combustion cycle (k). In some cases, the plurality is calculated from a plurality of sensors.

In some cases, an opcondition(k) describing an engine operating condition (during combustion cycle k) may be identified. The bandset(k) may be selected according to the identified opcondition(k). In some cases, a subsequent opcondition (k+1) may be adjusted in response to the bandchoice(k).

Calculating a knock indicator (e.g., r(k) and/or y(i,k)) may include filtering (e.g., bandpass-filtering) data from a sensor. The filtered data may be transformed into the frequency domain. One or more frequency windows within the transformed data may be selected, and the transformed data within each window may be integrated between the boundaries of the window. A knock indicator y(i,k) may be associated with each window.

Calculating the bandchoice(k) may include selecting a probability density function (PDF) for each band in the bandset (k), each each PDF quantifying the likelihood that a particular band yields a particular y(i,k). For a given set of one or more knock indicators y(i,k), the probability density at the y(i,k) for each of the PDFs may be calculated. The bandchoice(k) for combustion cycle (k) may be the Band having the highest probability density at the calculated y(i,k). The PDF may be calculated using systems and/or methods described herein.

A relationship between knock intensity y(i,k) from an opsensor and a reference value r(k) from a reference sensor may be determined using a system comprising an engine having a least one cylinder configured to combust a fuel/air mixture during a combustion cycle (k). The engine may be in communication with a reference sensor and an opsensor configured to measure knocking within the cylinder. A platform in communication with the sensors (and optionally, an engine control system) may comprise computing hardware and software. The hardware may comprise a processor, memory, and storage, which may store instructions executable by the processor for performing a method. The method may comprise operating the engine over a plurality of combustion cycles sufficient to generate a range of knock intensities within the cylinder, receiving, for a plurality of (e.g., each) combustion cycle, reference data from the reference sensor and opsensor data from the opsensor, calculating, for a plurality of (e.g., each) combustion cycles, r(k) from the reference data and y(i,k) from the opsensor data, creating an array of knock intensity data, the array comprising at least r(k) and y(i,k) for each of the combustion cycles, selecting at least two bands from the array, each band comprising a subset of combustion cycles for which r(k) of that combustion cycle is between an upper limit of r(k) and a lower limit of r(k) defining that band, calculating a probability density function (PDF) of the y(i,k) within each of the selected bands, each probability density function describing a statistical distribution of the values of y(i,k) within that band, and storing a bandset comprising the calculated probability density functions.

A PDF (e.g., each PDF of the plurality of PDFs to which y(i,k) might be assigned) may comprise a mean and a covariance between the different knock indicators y(i). For example, for N (i=1, . . . , N) knock indicators, measured over M combustion cycles, the covariance may describe the variance between y(i,k) for i=1, N and k=i+1, M. In some embodiments, a knock intensity bandset (for a particular operating condition) may have at least two Bands of knock intensity (e.g., 2-10, including 3-8, such as 4-6). Bandset may depend on (e.g., be associated with) an opcondition describing operation (e.g., load, speed) of the engine.

Identifying y(i,k) (e.g., selecting, calibrating, and/or calculating) a portion of data for calculating y(i,k)) may comprise, for example, the use of a prior calculation (e.g., using a system 100) in which reference data from a reference sensor and opsensor data from an opsensor may be received over one or more combustion cycles. One or more overlap regions between the reference data and opsensor data may be identified and/or calculated. An overlap region may comprise a portion of the data for which the opsensor correlates with the reference sensor, including raw data and/or transformed data (typically, regions in which the opsensor data do not correlate with the reference sensor data may be excluded). Each knock indicator y(i,k) may be associated with a particular overlap region. In some cases, time domain data are transformed (e.g., using fast fourier transform, FFT) to the frequency domain, and an overlap region may comprise a window of frequencies within which the reference data and opsensor data correlate. An overlap region may comprise a period of time (in the time domain, e.g., with respect to crank angle) in which the data from the sensors are correlated with each other. Anti-correlation (e.g., in a first region) may be combined with correlation (e.g., in a second region) to improve the estimation of the reference sensor using the opsensor.

The present description claims priority to U.S. provisional patent application No. 61/908,189, filed Nov. 25, 2013, the disclosure of which is incorporated by reference herein. The present description incorporates by reference related application PCT patent application no. PCT/EP2014/075417, filed Nov. 24, 2014, titled "Engine Management Using Knock Data," which also claims priority to U.S. provisional patent application No. 61/908,189. Systems and methods described herein may be used in combination with those disclosed in the aforementioned applications, and vice versa, mutatis mutandis.

DETAILED DESCRIPTION

Systems and methods disclosed herein may improve the accuracy and precision with which knocking may be observed, measured, and/or or otherwise characterized. With a more accurate estimate of knock intensity, engine performance (e.g., the balance between output and safety) may be optimized.

Various embodiments may provide for an improved estimate of a knock intensity during a combustion event. An improved proxy (e.g., for the knock intensity determined from a reference sensor) may be generated using a production sensor, and this proxy may be used in a production engine (e.g., not having a reference sensor) to monitor knocking in the engine using the production sensor.

In some embodiments, a statistical model is used to assign one or more knock indicator data to a characteristic knock intensity (e.g., low, medium, or high knock). A reference band of knock intensities may be those intensities, measured by a reference sensor, that have similar knock magnitude, intensity, duration, and/or other common features. A characteristic or "proxy" knock intensity may be a choice of which reference band (from the reference sensor) most likely correlates with the proxy knock intensity (from the production sensor).

For simplicity, systems and methods described herein may be used to characterize knocking. Various embodiments may also be applied to the characterization of misfiring, oil leaks, fuel problems, faulty spark plugs, and the like.

Various embodiments comprise computer-implemented methods, which may be performed on a platform comprising computing hardware and software instructions for that hardware. Some methods may be implemented using new hardware. Some implementations may use existing hardware, whose customization with new software creates a new machine. Various methods described herein may be implemented by platforms described herein.

Various aspects comprise one or more sensors. A sensor may provide data used to calculate the knock intensity during a combustion cycle (k) within the cylinder, and may monitor combustion within the cylinder (e.g., using ion current, by measuring pressure within the cylinder, acoustics outside the cylinder, and the like). A sensor may be external to the cylinder (e.g., an acoustic sensor on the engine block). A sensor may be a reference sensor (e.g., generating high quality data); a sensor may be a production sensor (e.g., that is economical and robust enough for a commercial engine).

Figure 1A:
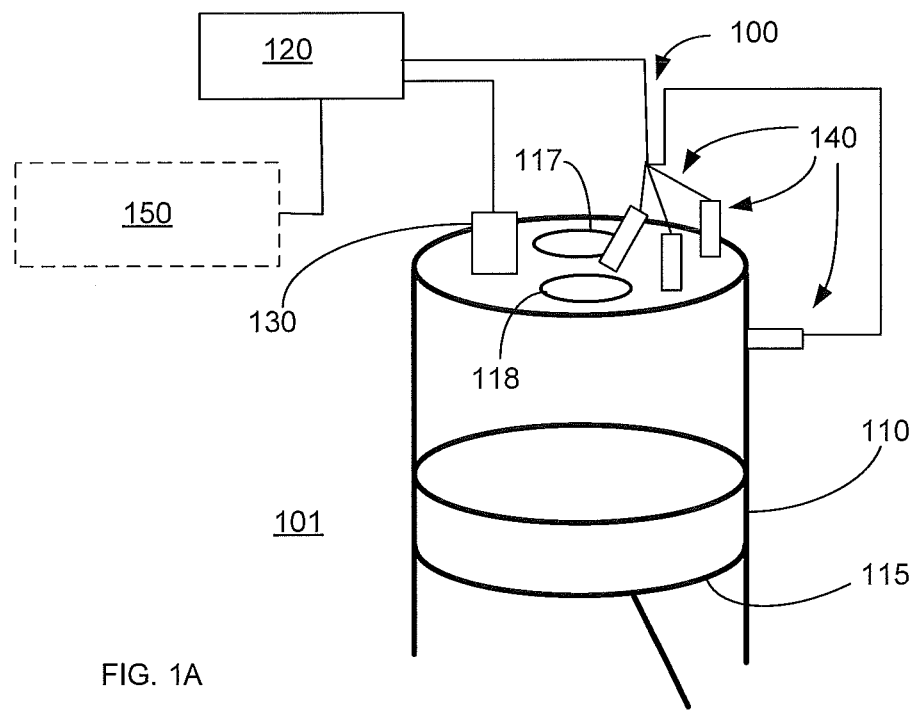
FIGS. 1A and 1B are schematic illustrations of various embodiments.
Figure 1B:
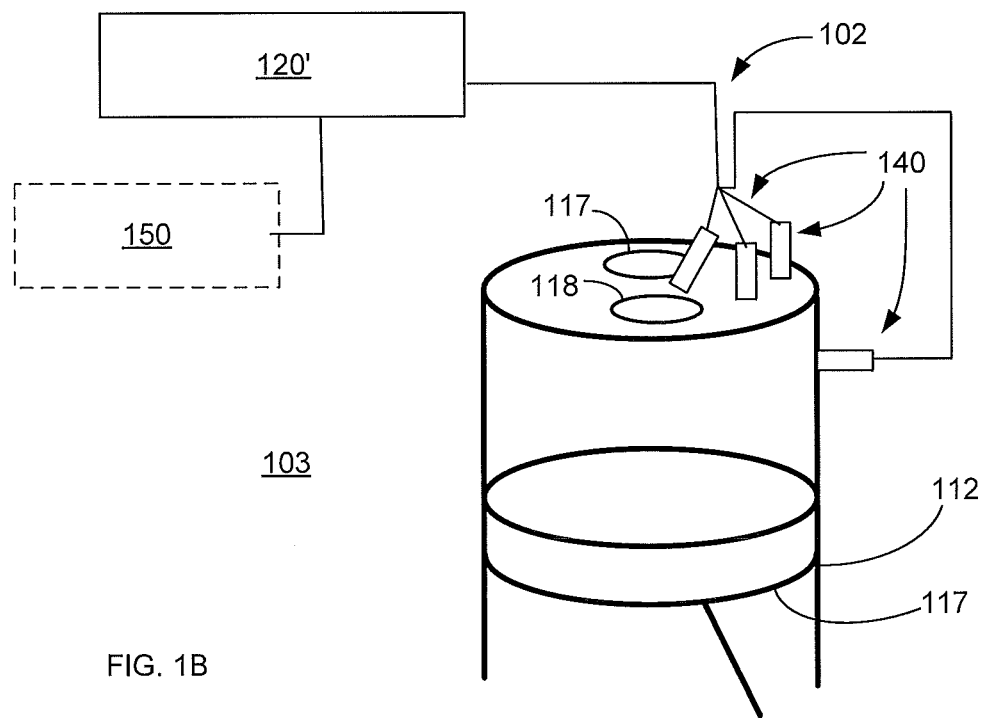

FIGS. 1A and 1B are schematic illustrations of various embodiments. FIG. 1A illustrates a system 100 comprising a benchmark engine 101. System 100 may be used to determine a reference knock intensity r(k) using a reference sensor 130, and generate a proxy for r(k) using data from one or more opsensors 140 that can be used in a production engine (e.g., a "production" or "commercial" sensor). FIG. 1B illustrates a system 102 comprising a production engine 103. System 102 may be used to measure knock intensity in production engine 103 using one or more opsensors 140.

In system 100, a benchmark engine 101 comprises a cylinder 110, piston 115, intake valve 117, and exhaust valve 118. Compressed fuel/air mixtures within the cylinder are combusted (e.g., with a spark plug or via compression and direct injection of fuel). A reference sensor 130 may provide data used to calculate r(k), a reference knock intensity for combustion cycle (k). Reference sensor 130 may provide "high quality" knock information, but might be impractical (e.g., too bulky, too expensive, not durable enough) for a production engine. Reference sensor 130 may provide data for calculating a single r(k) and/or r(i,k), a plurality of data (i) associated with a particular combustion cycle (k).

An opsensor 140 may comprise a sensor suitable for use in a production engine. Opsensor 140 may provide "production" knock information, suitable for managing a commercial engine during operation. An engine may use a single opsensor 140. An engine may use a plurality of opsensors 140, including two or more opsensors sensing the same cylinder. Sensors may be located at different positions (e.g., radii, distances from one or more valves, inside and outside a swirl bowl in a piston, not shown) in the cylinder. Sensors may be located inside and outside the cylinder. FIGS. 1A and 1B are illustrative of representative locations, and not intended to be limiting.

The sensors may be in communication with a platform 120 configured to control the sensors, which may include and/or be in communication with other hardware and software used to control the engine, such as an engine control system 150. System 100 may be used to generate a "proxy" knock intensity (using opsensor 140) that best represents the "reference" knock intensity generated by reference sensor 130.

In operation of a production engine 103, for a combustion cycle (k), opsensor 140 may generate data used to calculate one or more knock indicators, represented as y(i,k), (where i can vary from 1 to a desired number of knock indicators, e.g., 3, 5, 7). Knock indicators y(i,k) may be used to calculate a proxy for the reference knock intensity r(k) that would have been expected from reference sensor 130, were such a sensor implemented in production engine 103. This proxy may improve the accuracy and precision of knock sensing during operation of production engine 103.

For a combustion cycle (k), a plurality of y(i,k) may be combined to generate Y(k), which may be expressed as a vector of the various y(i,k), e.g.:

$$y(k) = \begin{pmatrix} y(1, k) \\ y(2, k) \\ \vdots \\ y(3, k) \end{pmatrix}.$$

Y(k) may be a proxy for r(k). Some embodiments perform calculations using y(i,k); some embodiments perform calculations using Y(k).

For simplicity, certain embodiments are described with respect to a single combustion cycle (k=1), with the "k-notation" omitted. However, such embodiments may be extended to a plurality of combustion cycles (k).

For a given combustion cycle (k), opsensor 140 may generate a plurality of y(i,k) using one sensor that yields several pieces of information (e.g., a base frequency and overtones of a resonant pressure wave associated with knocking). Opsensor 140 may include a plurality of sensors (e.g., in different locations), including an in-cylinder sensor and an ex-cylinder sensor, and/or several in-cylinder and/or several ex-cylinder sensors. Sensors may be located at different distances from the center of a cylinder. Sensors may be located at different locations with respect to an intake valve 117 and/or an exhaust valve 118. Sensors may be located in the cylinder head and/or the engine block. Some embodiments utilize several knock indicators from a single sensor. Some embodiments utilize knock indicators received from several different sensors. Some embodiments utilize several sensors, each of which provides data used to calculate a plurality of knock indicators. In some cases, opsensor 140 includes an ion sensor, which may include a spark plug, which may be integrated with an ignition system for the engine (not shown).

In system 100, sensors are in communication with a platform 120, which may comprise computing hardware and software configured to monitor the sensors, and may also monitor engine operation (e.g., via communication with an engine control system, not shown). Platform 120 may receive (e.g., from engine control system 150) data identifying an operating condition of the engine during a particular combustion cycle (k), described herein as opcondition(k).

Opcondition(k) may characterize the engine operating condition that yielded combustion cycle (k), which yielded knock indicators y(i,k) and (in some cases) reference knock intensity r(k).

System 100 may be used to identify one or more knock intensity bands. A band may be a categorical identifier (e.g., low, medium, high) and/or numerical value (0, 1, 2, 3, 4, 5) of an intensity or magnitude of a knocking event. A band may comprise a plurality of values of r(k), each from a different combustion cycle and having similar intensities.

In system 102, a production engine 103 comprises a production cylinder 112 and a production piston 117, and may be an engine suitable for mass production. One or more opsensors 140 sense data (e.g., associated with knocking) during operation of production engine 103. Platform 120' is in communication with an engine control system 150 and opsensor 140. Platform 120' may use data from opsensor 140 to calculate, for a given combustion cycle (k), one or more knock indicators y(i,k), which may be used to determine a bandchoice(k) for combustion (k). Bandchoice(k) may be the band of knock intensities associated with the reference knock intensity r(k) that is likely (e.g., most likely) to have resulted in the calculated y(i,k) determined from opsensor data from combustion cycle (k). In some aspects, bandchoice(k) (calculated from opsensor 140) may be a proxy for a reference knock intensity r(k) that would have been calculated from a reference sensor 130.

An operating condition (e.g., load, speed, ignition timing, injection timing, valve timing, BMEP, and the like) of the engine may affect knocking. A particular combustion cycle (k) may be associated with a particular operating condition. In some embodiments, an opcondition(k) (e.g., received from engine control system 150) may identify an operating condition of the engine. Opcondition(k) ma be used to select a Bandset(k) used to analyze combustion cycle (k). Results of various calculations (e.g., Bandchoice(k), y(i,k), Y(k)) may be used by engine control system 150 to operate production engine 102 (e.g., by changing a tune state of the engine). The operating condition may be updated using these results. For convenience, Table 1 presents the following definitions:

| Term | Definition |
| --- | --- |
| (k) | reference to a particular combustion cycle |
| Opcondition(k) | set of engine operating conditions during combustion cycle (k) |
| y(i, k) | knock indicators (i) characterizing combustion cycle (k), calculated from opsensor data |
| Y(k) | vector description of knock intensity for combustion cycle (k) from y(i, k) (e.g., fxn(y(1, k), y(2, k), y(3, k)) |
| r(k) | reference knock intensity for combustion cycle (k), calculated from reference sensor |
| Band | categorical/numerical identifier that describes an intensity of knocking (e.g., low, medium, high); may include a range of r(k) |
| bandset(k) | for a given combustion cycle (k) (e.g,. at a given opcondition(k)), the set of bands that characterize the range of possible knock intensities; in production, may be the set of choices of PDF to which a new y(i, k) may be assigned |
| bandchoice(k) | the choice of the (e.g., most likely) knock intensity Band (from bandset(k)) that yielded a particular y(i, k) calculated from opsensor data from combustion cycle (k) |

Figure 2:
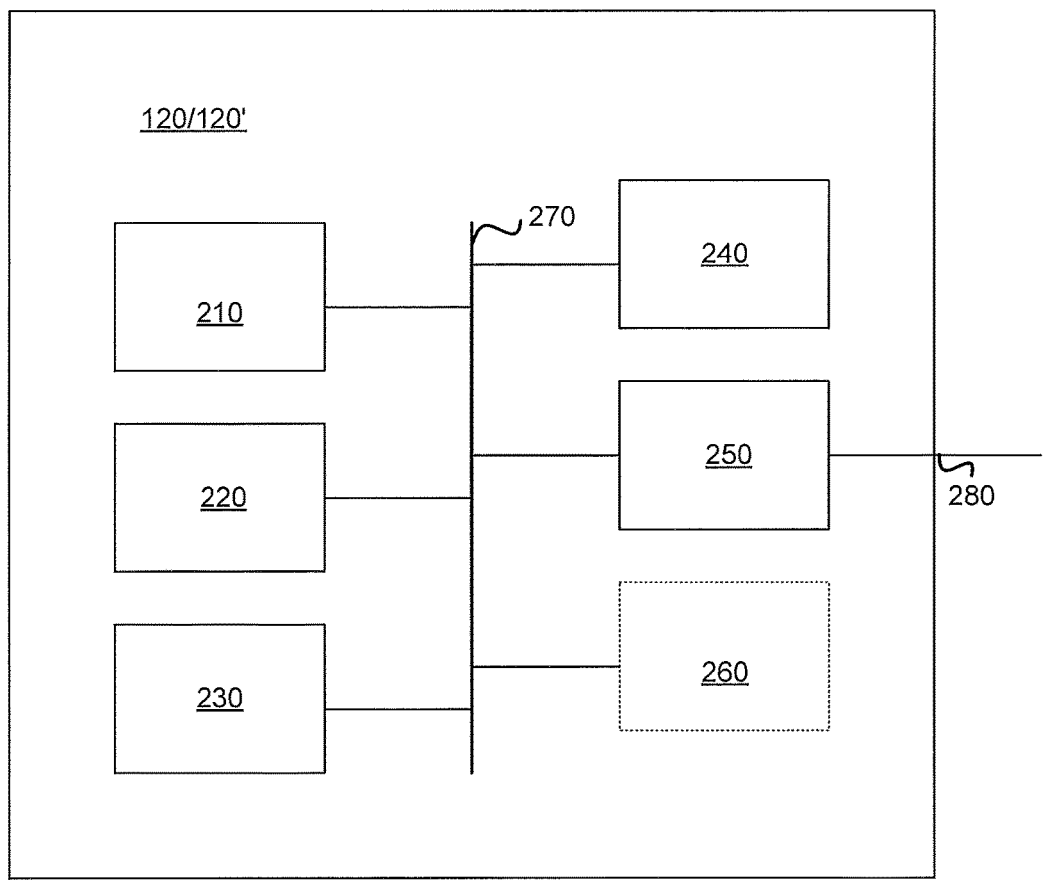
FIG. 2 is a schematic illustration of several exemplary components of a platform, according to certain embodiments.

FIG. 2 is a schematic illustration of several exemplary components of a platform, according to certain embodiments. A platform (e.g., 120/120') may comprise hardware (e.g., a processor, memory, storage, and the like) and software (e.g., instructions stored in the memory and executable by the processor to perform a method). Platform 120 may include and/or communicate with a server, such as a web server, an application server, a database server, and the like. Platform 120 may include or provide input for graphical and/or audio output to user devices. Platform 120 may be configured to receive input from the user devices. In some configurations, a user device communicates with platform 120 using a standard internet protocol (IP) over network 110, and may use one or more IP addresses. In some cases, communications may include encrypted information.

In exemplary embodiments, platform 120/120' includes a variety of hardware components, including processor 210, memory 220, storage 230, input/output (I/O) interface 240, communication network interface 250, and display interface 260. These components may be generally connected via a system bus 270. Platform 120 may communicate (e.g., with engine control system 150) via communication bus 280. In some embodiments (e.g., as in FIG. 1A), platform 120 includes a video card and/or display device (not shown).

Processor 210 may be configured to execute instructions. In some embodiments, processor 210 comprises integrated circuits or any processor capable of processing the executable instructions. In some embodiments, processor 210 may include a cache, a multi-core processor, a video processor, and/or other processors. Processor 210 may include a programmable logic controller (PLC).

Memory 220 may be any memory configured to store data. An example of memory 220 includes a computer readable storage medium, which may include any medium configured to store executable instructions. For example, the memory system 220 may include, but is not limited to, storage devices such as RAM, ROM, MRAM, flash memory, and/or memory.

Certain configurations include storage 230 as part of platform 120. In other configurations, storage 230 may be implemented remotely, for example as part of a remotely located database (not shown). Storage 230 may be any storage configured to receive, store, and provide data. Storage 230 may also include computer readable storage media such as a memory, a hard drive, an optical drive, and/or magnetic tape. Storage 230 may include a database or other data structure configured to hold and organize data. In some embodiments, platform 120 includes memory 220 in the form of RAM and storage 230 in the form of a hard drive and/or flash memory.

Input and output (I/O) may be implemented via I/O interface 240, which may include hardware and/or software to interface with various remotely located devices such as a user device and/or an engine control system. I/O interface 240 may interact with a local keyboard, mouse, pointer, and the like in some embodiments.

Communication network interface 250 may communicate with various user devices, and such communications may include the use of a network, such as a LAN, WAN, and/or the internet. Communication network interface 250 may support serial, parallel, USB, firewire, Ethernet, and/or ATA communications. Communication network interface 250 may also support 802.11, 802.16, GSM, CDMA, EDGE and various other wireless communications protocols.

Display interface 260 may include any circuitry used to control and/or communicate with a display device, such as an LED display, an OLED display, a CRT, a plasma display, and the like. In some configurations, display interface 260 includes a video card and memory. In some configurations, a user device 100 (FIG. 1) may include a video card and graphic display, and display interface 260 may communicate with the video card of user device 100 to display information.

The functionality of various components may include the use of executable instructions, which may be stored in computer readable storage media (e.g., memory and/or storage). In some embodiments, executable instructions may be stored in memory 220 and/or storage 230. Executable instructions may be retrieved and executed by processor 210, and may include software, firmware, and/or program code. Executable instructions may be executed by the processor to perform one or more methods.

Figure 3A:
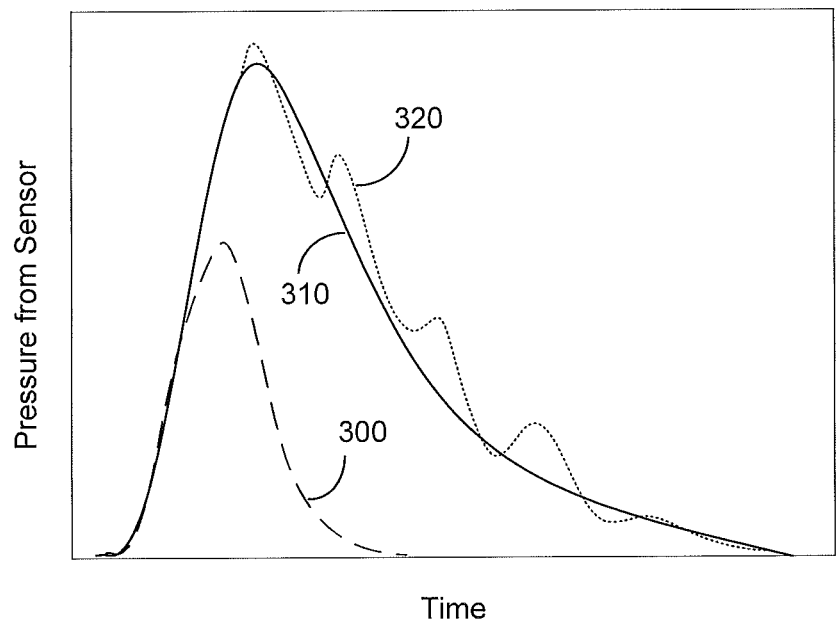
FIGS. 3A and 3B illustrate representative knock data, according to some embodiments.
Figure 3B:
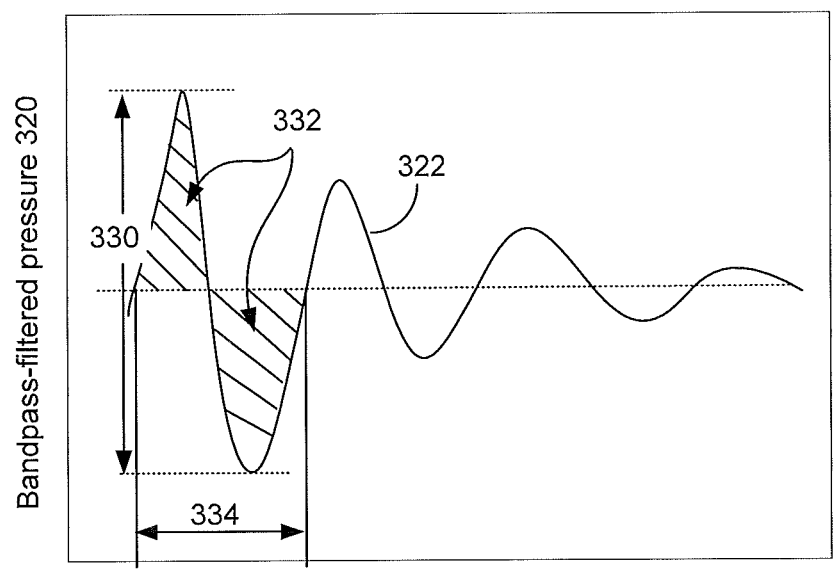

FIGS. 3A and 3B illustrate representative knock data, according to some embodiments. FIG. 3A schematically illustrates pressure data from a reference sensor 130 as a function of time during a single combustion cycle (k). Noncombustion curve 300 describes the pressure within the cylinder that might have occurred without combustion (e.g., from the piston pressurizing the cylinder). Combustion curve 310 illustrates pressure within the cylinder during a controlled combustion event. Knocking curve 320 illustrates a representative knocking response, and may incorporate both a low frequency component (e.g., as in combustion curve 310) superposed with one or more high frequency components (which may be associated with resonance within the cylinder).

Knocking curves may be noisy and/or include information that is not valuable, and so may be processed to separate useful information from low-value information; this "extraction" of useful information may increase "information density"—(keeping valuable information in a smaller set of data). Various embodiments describe signal processing methods for extracting useful information from sensor information and removing information that does not improve knocking detection sensitivity, accuracy, and/or reproducibility. In some cases, a subset of sensor data is identified that has improved accuracy and/or precision. In some cases, an improved subset of measurements (e.g., from different sensors and/or at different times) is identified.

FIG. 3B illustrates an exemplary processing, in which knocking curve 320 has been bandpass-filtered. Bandpass-filtering may include removing signal components outside a desired range (or band). Filtered curve 322 may be a bandpass-filtered version of knocking curve 320.

Various data associated with knock intensity may be extracted from filtered curve 322. When filtered curve 322 results from reference sensor 130, such data may be used as a reference knock intensity, r(k), of which several examples are shown. Reference knock intensity r(k) 330 may be the maximum magnitude change of filtered curve 322 (e.g., within a given time period within a combustion cycle). Reference knock intensity r(k) 332 may be an integrated area (e.g., over a period of time), including a plurality of integrated areas. As discussed later, r(k) may also be associated with magnitudes and/or integrated areas performed after other processing (e.g., transforming filtered curve 322 to the frequency domain).

Figure 4:
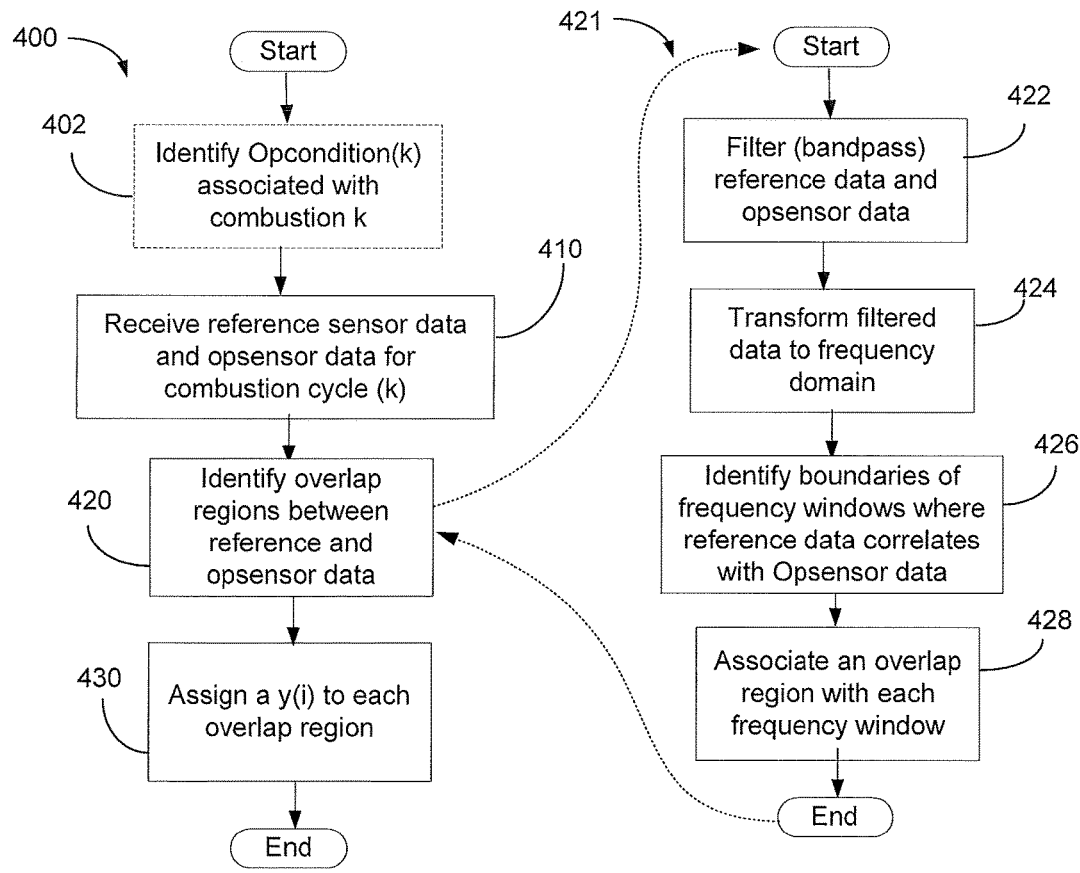
FIG. 4 illustrates a method for identifying one or more knock indicators, according to some embodiments.

FIG. 4 illustrates a method for identifying one or more knock indicators y(i,k), according to some embodiments. A set of knock indicators y(i,k) (for i=1 to m) may include one or more indicia of an intensity of knocking during combustion cycle (k), based on data provided by opsensor 140. In simple implementations, m=3. In some embodiments, m>3, including >4, including >6, including >10.

Method 400 (e.g., with system 100, FIG. 1) may be used to extract one or more y(i,k) that may be used as (or used to calculate) a proxy for a reference knock indicator r(k). The extracted knock indicators y(i,k) from opsensor 140 may best represent the reference knock intensity r(k) calculated from reference sensor 130. These data may then be used in a production engine 103 to determine y(i,k) (from its respective opsensor 140) during operation.

In optional step 402, an opcondition(k) for combustion cycle (k) is identified. In some engines, an operating condition may affect knocking, and a response to a perceived knock may vary according to the operating condition. In some embodiments, opcondition(k) may not be needed. In some cases, each combustion cycle (k) is associated with a particular opcondition(k).

In step 410, reference sensor data and opsensor data are received for a combustion cycle (k). In step 420, an overlap region is identified. An overlap region may include a portion of data in which the opsensor data and reference sensor data "agree" and/or otherwise correlate with each other. In some cases, an overlap may be assessed in the time domain; in some cases the data are processed (e.g., into the frequency domain). Other signal processing methods may be used to transform the data prior to assessing overlap.

In step 430, a y(i) is "assigned" to or otherwise associated with an overlap region. In some cases, a single overlap region yields a single y(i), and so during operation, y(i,k)=y(1,k). In some cases, a plurality of n (e.g., n=2, 3, 4, 5, 10) of overlap regions is identified and during operation, a plurality of knock indicators y(i=1 to n, k) is extracted for each combustion cycle (k).

Various algorithms may be used to identify overlap regions. In some cases, data may be filtered, rectified, and summed (e.g., choosing portions of the reference sensor and opsensor data that match each other). In some cases, data may be transformed.

Method 421 illustrates an exemplary method for identifying overlap regions. In step 422, data from reference sensor 130 and opsensor 140 may be filtered (e.g., bandpass-filtered). In step 424, the filtered data are transformed (e.g., using fourier transforms such as FFT) to the frequency domain. Such transformation may result in windows within which the (filtered and transformed) opsensor data and reference data correlate. In step 426, the boundaries of one or more windows (e.g., frequency windows) are identified. These windows may include portions of the data for which the opsensor data represent the reference sensor data, and may exclude other portions of the data in which the opsensor data do not correlate with the reference sensor data. The number of windows (1, 2, 3, 4, 5, 10, 20, 100) may be chosen according to how well the respective data match each other. In step 428, an overlap region is assigned to each frequency window, which subsequently governs the portion of data used to calculate that particular y(i).

Figure 5A:
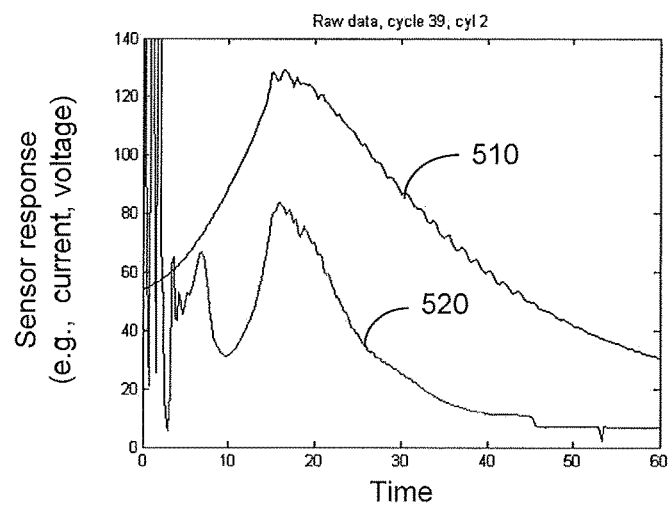
FIGS. 5A-C illustrate examples of such knock indicator identification, according to some embodiments.
Figure 5B:
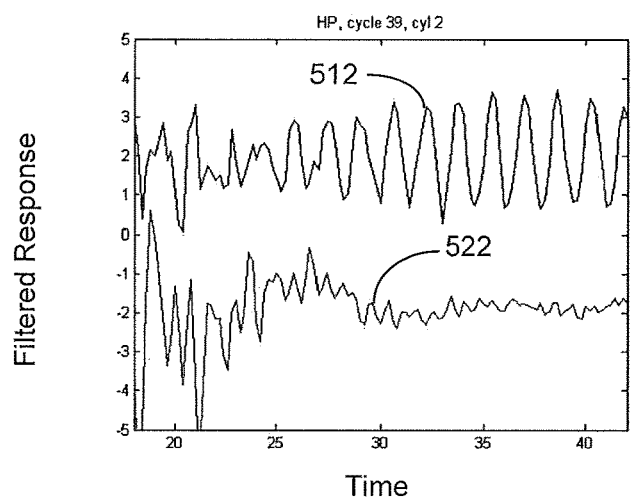
Figure 5C:
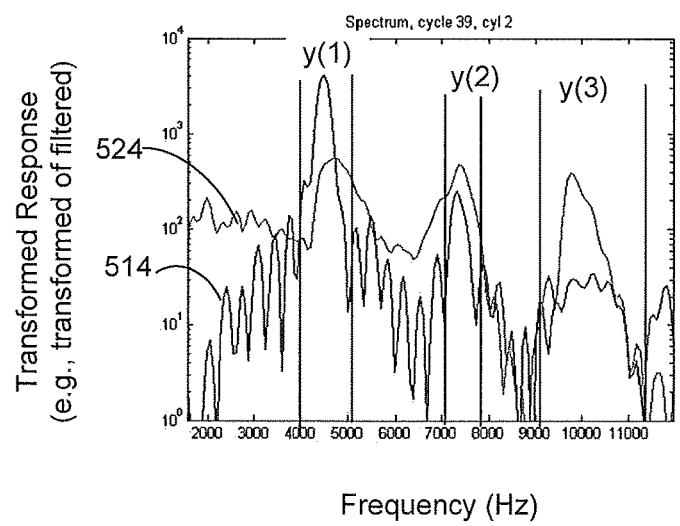

FIGS. 5A-C illustrate examples of knock indicator identification, according to some embodiments. FIGS. 5A-C illustrate the extraction of y(i) from data transformed in the frequency domain; extractions may be performed in the time domain.

FIG. 5A illustrates representative knocking curve 510 from a reference sensor, and knocking curve 520 from an opsensor. FIG. 5B illustrates bandpass-filtered versions of the data in FIG. 5A, showing filtered data 512 from the references sensor and filtered data 522 from the opsensor.

FIG. 5C illustrates transformed data (in this case, to the frequency domain, FD), according to some embodiments. FD 514 corresponds to the reference sensor data, and illustrates the results of transforming filtered data 512 using FFT. FD 524 corresponds to the opsensor data, and illustrates the results of transforming filtered data 522 using FFT.

FIG. 5C illustrates several exemplary overlap regions (in this case, three frequency windows), according to some embodiments. For simplicity, these frequency windows have been identified by the knock indicator y(i) with which they can be associated. In this example, y(1) may correspond to a frequency window between 4000 and 5000 Hz, y(2) may correspond to a window between 7000 and 8000 Hz, and y(3) to a window between 9500 and 11000 Hz. According to engine design (e.g., cylinder dimensions, pressure, etc.) an exemplary frequency window (e.g., for a mobile application) may include:

i. a ground frequency of the knock signal, typically around 4-5 kHz in a typical mobile application
ii. the 1st overtone, typically around 7-9 kHz in a typical mobile application
iii. the 2nd overtone, typically around 10-12 kHz in a typical mobile application.

Appropriate frequency windows for various engine sizes may be chosen according to factors such as cylinder volume, geometry, pressure (e.g., compression ratio) and the like. A small engine (e.g., having a displacement below 0.5 liters/cylinder, including below 0.2 liters/cylinder) might have a higher ground frequency than that of an automobile (e.g., 0.5-1 liters/cylinder), which may have a higher ground frequency than that of a typical HD truck (e.g., 1-3 liters/cylinder), which may have a higher ground frequency than that of a large genset or power plant (e.g., over 3 liter/cylinder, over 10 liter/cylinder, over 100 liter/cylinder). In the case of very large engines (e.g., over 500 liters/cylinder, or even over 1000 liters/cylinder), a very low ground frequency may be measured. Additional responses associated with more complex resonance may also be measured.

In some cases, a window may be defined based on engine parameters (e.g., cylinder dimensions, pressures, and the like). In some cases, a window may correspond to a region in which the difference between curves is minimal (e.g., Absolute value of (FD 514–FD 524)<threshold). In some cases, a window may be range of frequencies within which the integral of FD 514 (between the boundaries of the window) closely matches that of FD 524.

During operation (e.g., of a production engine 103), opsensor data may be processed to extract values for y(i,k) based on calibrations and/or calculations performed with a benchmark engine 101 (FIG. 1A). Using exemplary FIG. 5C, each value for y(1), y(2), y(3) may be the area (under FD 524) of the respective frequency window defined the upper and lower boundaries of that window. In an embodiment, the boundaries of a particular y(i) define contiguous portions (of the reference and opsensor responses) in which the magnitudes (e.g., of the transformed responses, see FIG. 5C, y(1) and y(2)) are similar (e.g., within a threshold of each other). In some cases, the boundaries may define contiguous portions in which the derivatives have the same sign (e.g., in FIG. 5C, when the reference data are rising, the opsensor data are rising; when the reference data are falling, the opsensor data are falling, see y(2) and upper boundary of y(3)). Averaging (over a small range of frequencies across an overlap region) may be used to "smooth" the data to account for small discrepancies (e.g., the lower boundaries of y(1) and y(3)).

While FIG. 5C illustrates the extraction of y(i) information, similar processes may be used to extract r(i), which may be a composite of values extracted from the reference sensor. In an exemplary embodiment, a reference knock indication comprises a plurality of r(i,k) for a given combustion cycle (k).

Extraction of a plurality of knock indicators from a given combustion cycle may improve the information quality used to monitor the engine. The elimination of data that are not useful (e.g., data outside an overlap region) may reduce computational and storage demands. Such extraction may provide for the "discretization" of sensor data into a plurality of separate subsets, each with its own correlation response between the reference sensor and opsensor. In some embodiments, at least two, including at least three, four, five, six, or at least seven knock indicators are calculated. The number of knock indicators may be determined by choosing the number that best combines increased correlation (between sensors) subject to various constraints (e.g., computational constraints). In cases where it is advantageous to minimize computational requirements, fewer than 20, including fewer than 10, including fewer than six knock indicators may be used. In an embodiment, at least three and no more than 8 knock indicators are used.

Figure 6A:
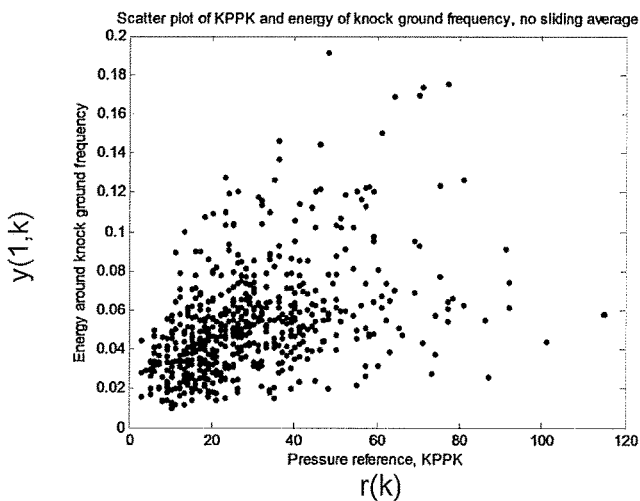
FIGS. 6A-C illustrate several exemplary extractions of y(i,k) for a plurality of combustion cycles (k).
Figure 6B:
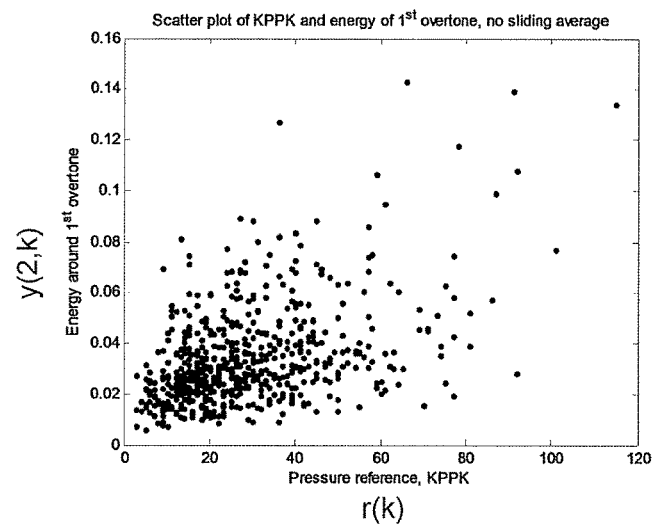
Figure 6C:
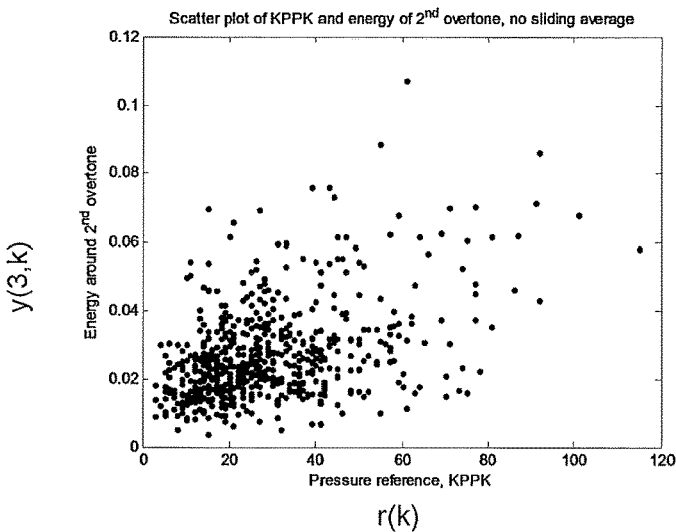

FIGS. 6A-C illustrate several exemplary extractions of y(i,k) for approximately two hundred combustion cycles (k) in a spark-ignited (SI) Natural Gas engine. For k=1, n combustion cycles, these plots show the correlation between y(i,k) (extracted from opsensor 140) and r(k) (extracted from reference sensor 130). FIG. 6A illustrates the correlation between a fundamental tone y(1,k) vs. r(k). FIG. 6B illustrates the correlation between the 1st overtone y(2,k) vs. r(k). FIG. 6C illustrates the correlation between the 2nd overtone y(3,k) vs. r(k). In these examples, each y(i,k) is correlated with r(k), and so each y(i,k) may provide useful information. However, the data are relatively noisy, and one indicator might not be more useful than another. As such, the extraction of this useful information (e.g., to calculate a knock intensity for a given combustion cycle) should accommodate this noise, and should preferably incorporate the "useful information" from each of the indicators to improve the estimate of knock intensity.

For a measurement of a given combustion cycle (k), values of knock indicators y(i) may be used to determine a knock intensity for that combustion cycle. Various embodiments provide for methods of calculating a proxy for r(k) based on one, preferably two or more y(i,k). In some cases, a linear combination of y(i,k)) may be chosen (e.g., using least squares fitting) that results in a function of y(i,k) that is a proxy for r(k) (e.g., an estimate of r(i)=a*y(1,k)+b*y(2,k)^2+c*y(3,k)^0.5). In some embodiments, a statistical analysis of a first set of y(i,k) may be used to generate a probability that a subsequent y(i,k) is associated with a particular knock intensity.

Figure 7:
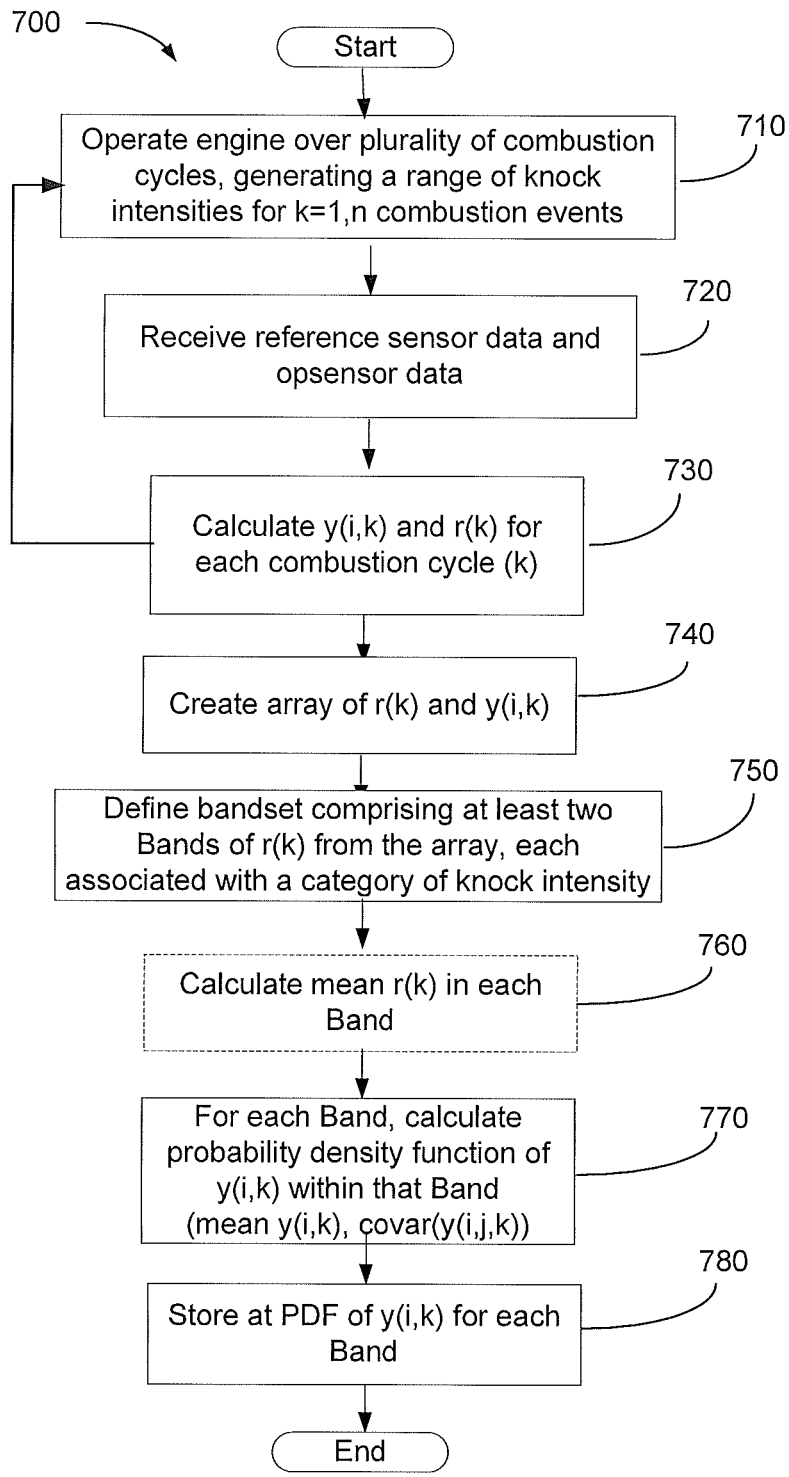
FIG. 7 illustrates a method for determining a probability density function (PDF) associated with a band or category of knock intensity, according to some embodiments.

FIG. 7 illustrates a method for determining a probability density function (PDF) associated with a band or category of knock intensity, according to some embodiments. These PDFs may subsequently be used during operation of a production engine to associate a newly calculated y(i,k) with a knock intensity Band (e.g., low, medium, high) representative of r(k).

Method 700 may be operated using system 100 to generate one or more PDFs, each of which may characterize a knock intensity. For simplicity, the incorporation of opsensor(k) information is not shown in FIG. 7, although such information may be included.

In step 710, an engine (e.g., benchmark engine 101) is operated such that a range of knock intensities is generated. Typically, a large number n of combustion events (e.g., n>100, 100, 1000, 10,000, or even 1,000,000 events) are used to generate a sample distribution of combustion conditions. This sample distribution may represent an expected range of combustion conditions that a production engine might generate. Step 710 may be repeated at different operating conditions to generate a distribution of events at several different opconditions.

In step 720, reference sensor data and opsensor data are received (and optionally stored) for each combustion cycle. In step 730, y(i,k) and r(k) are calculated (e.g., using previously identified overlap regions, e.g., method 400). These calculations may generate y(i,k) and r(k) for each of the k=1, n combustion cycles.

In step 740, the set of y(i,k) and r(k) may be ordered (e.g., sorted) or otherwise prepared for Band selection. A Band may comprise a "canonical" intensity value (e.g., none, barely, weak, medium, strong, very strong, extremely strong, or 0, 1, 2, 3, 4, 5, 6, 7) that describes that range of knock intensities to which that value is may be assigned. For example, for a set of measurements generating a range of reference knock intensities r(k), all the values of r(k) between a lower limit and an upper limit might be characterized (or generalized) as being "medium knock." Values of r(k) between two higher limits might be characterized as "high knock." Values of r(k) below a particular value might be characterized as "no knock."

In some embodiments, an array of r(k) and y(i,k) is sorted by r(k) (e.g., from low to high). Each Band may correspond to a set of y(i,k) for which the corresponding r(k) is between an upper Band limit and a lower Band limit. A Band may be immediately adjacent (in the sequence of r(k)) to another Band (e.g., the upper limit of r(k) for one band is next in sequence to the lower limit of r(k) for the next band). In some embodiments, Bands are separated by a "gap set" of one or more measurements not associated with either band. The "width" of the band may correspond to the accuracy with which r(k) is known and/or sampled. For some r(k) measurements, using a large number of data, each Band may correspond to a narrow range of r(k) (between upper and lower limits) that may be identified with a particular knock intensity. In this case, many of the r(k) data might not be assigned to any Band. In some cases, most, or even all, of the r(k) data are assigned to a Band.

Data having r(k) values outside the Band may be excluded from subsequent calculations. Exclusion of such data may improve the statistical accuracy of various methods. For example, by selecting a "tight" band (e.g., a subset of data that does not incorporate much variability in r(k)," the expected variance (during operation) may be restricted to that associated with opsensor measurements. Table 1 illustrates a portion of a representative array, with two Bands (Band 0=low intensity and Band 1=high intensity) identified.

TABLE 1

| Band<br>0 = Low; 1 = High | r(k)<br>(e.g. pressure) | y(1, k)<br>(e.g. ion sense) |
| --- | --- | --- |
| 0 | 1.8 | 1.5 |
| 0 | 1.8 | 3.5 |
| 0 | 1.7 | 1.2 |
| 0 | 2.0 | 1.6 |
| 0 | 2.1 | 1.4 |
| 0 | 2.8 | 0.9 |
| 0 | 3.5 | 1.8 |
| 0 | 2.5 | 1.8 |
| 0 | 1.8 | 3.4 |
| 0 | 2.6 | 1.8 |
| 1 | 6.3 | 4.7 |

TABLE 1-continued

| Band<br>0 = Low; 1 = High | r(k)<br>(e.g. pressure) | y(1, k)<br>(e.g. ion sense) |
| --- | --- | --- |
| 1 | 4.5 | 7.9 |
| 1 | 7.3 | 7.5 |
| 1 | 6.4 | 5.7 |
| 1 | 6.2 | 4.2 |
| 1 | 6.7 | 5.5 |
| 1 | 6.4 | 5.8 |
| 1 | 4.7 | 6.3 |
| 1 | 5.8 | 5.7 |
| 1 | 5.8 | 6.5 |

Typically, at least two Bands, associated with two different knock intensities, are generated. In some cases, three, four, five, or even ten knock intensity categories may be generated (for a particular operating condition). The set of Bands used during operation may vary according to the operating condition (e.g., one set of Bands when the engine is idling, another set of bands when the engine is under high load). For an engine in which opcondition(k) is used to select a set of PDFs, more than 10, 100, or even more than 1000 PDFs may be stored, and an appropriate set of PDFs may be chosen according to operating condition.

In illustrative step 750, at least two Bands of r(k) are selected (e.g., corresponding to "low" and "high" knock), each having its associated values for y(i,k). In some cases, at least three Bands may be selected (e.g., corresponding to "weak knock" "medium knock" and "strong knock"). In optional step 760, an identifying or canonical value of r(k) for the Band may be calculated from data within the Band (e.g., a mean r(k), a median r(k)).

In step 770, the statistical distribution of y(i,k) within each band may be analyzed. In some cases, a probability density function (PDF) of y(i,k) within each band may be generated. The PDF may comprise a mean (of the distribution) and/or a covariance (i,j) (e.g., between y(1,k) and y(2,k)). A mean y(i,k) (over the set of combustion cycles in a particular band) may be associated with an identifying r(k) (e.g., the mean r(k)).

Within a Band, the PDF provides an estimate of the expected distribution of y(i,k) for knocking events for which a corresponding reference knock intensity r(k) is within that Band. When r(k) within the Band is tightly distributed, the Band may represent "replicate" combustion events at a particular reference knock intensity (i.e., those between the limits of r(k) that define the Band). These replicate events may have a spread of values (e.g., associated with error from measuring using an opsensor) manifest in the PDF of y(i,k). The PDF for a Band may quantify the distribution of this error, and may represent the accuracy with which a particular knock intensity can be determined using an opsensor. During operation of a production engine, the expected error associated with an opsensor's measurement (of a given knock intensity) may be explicitly incorporated into the determination of knock intensity.

In step 780, the PDFs for the Bands are stored (e.g., as a bandset). A bandset may comprise a plurality of PDFs, and may be subsequently used to analyze opsensor data. In some cases, the bandset (and corresponding PDFs) may be associated with an operating condition. For example, an idling operating condition may be analyzed using a bandset having two PDFs, a "low" and a "high" knock intensity. A high load operating condition may be analyzed using a bandset having four PDFs, "low," "medium," "high," and "damaging."

Figure 8:
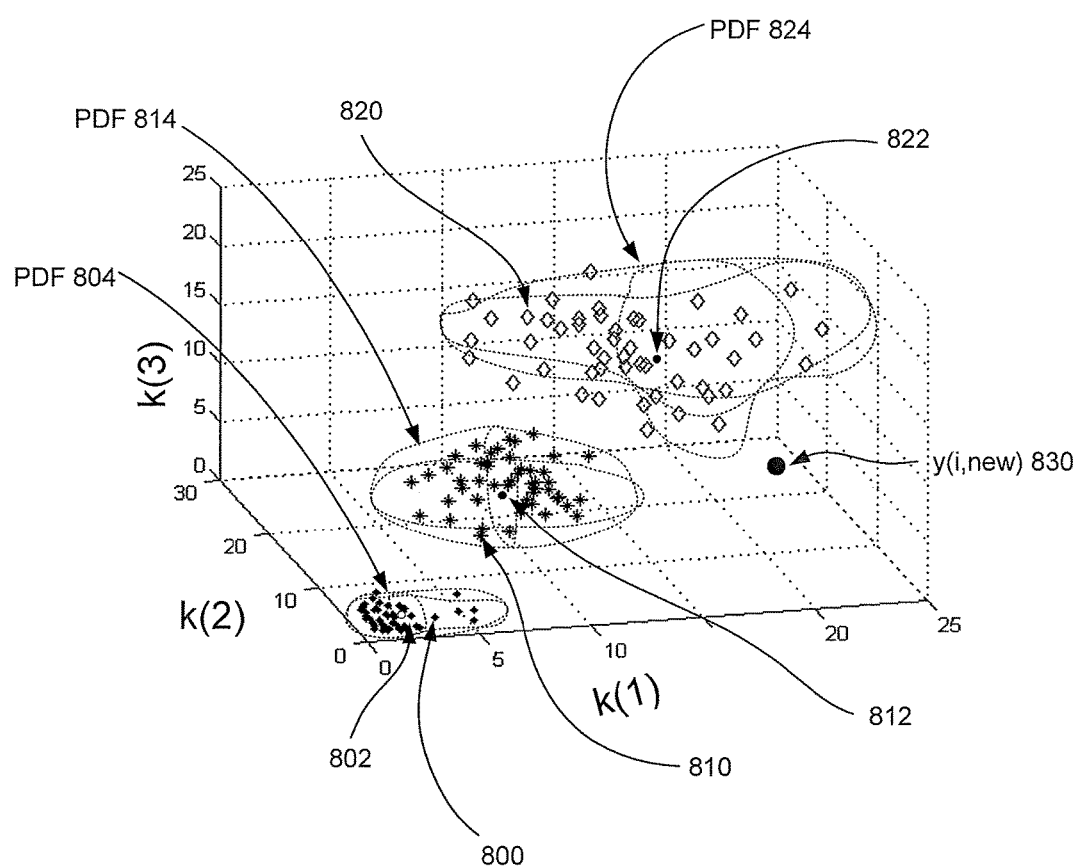
FIG. 8 illustrates an example, according to some embodiments.

FIG. 8 illustrates an example, according to some embodiments. FIG. 8 illustrates a graphical result (e.g., of method 700) using a bandset of three PDFs, which were calculated from r(k) and y(i,k) data for which i=3 (i.e., three different knock indicators for each combustion cycle (k). FIG. 8 plots y(1) vs. y(2) vs. y(3) for the data falling within three different Bands, with each Band identified by a different symbol. FIG. 8 shows representative values of y(i,k) used to generate each PDF, along with a graphical representation of each PDF using dotted lines.

Data points 800 correspond to y(i,k), for those combustion cycles (k), in which r(k) for those combustion cycles are in a "low" Band of knock intensities. Data points 800 may be characterized by y(i,mean) 802, which may be the mean of those values within that band. Data points 800 may be characterized by PDF 804 (represented graphically using a dotted line), which may include y(i,mean), which describes the statistical distribution of data points 800.

Data points 810 correspond to those y(i,k) for combustion cycles (k) in which r(k) for those combustion cycles are in a "medium" Band of knock intensities. Data points 810 may be characterized by y(i,mean) 812, which may be the mean of those values within that band. Data points 810 may be characterized by PDF 814 (which may include y(i,mean)) which describes the statistical distribution of data points 810.

Data points 820 correspond to those y(i,k), for combustion cycles (k) in which r(k) for those combustion cycles are in a "high" Band of knock intensities. Data points 820 may be characterized by y(i,mean) 822, which may be the mean of those values within that band. Data points 820 may be characterized by PDF 824 (which may include y(i,mean)) which describes the statistical distribution of data points 820.

There may be different distributions that may be used to compute the desired statistical models to describe the knock intensity data. A normal distribution may reduce computational demands. Chi-squared and/or gamma distributions may be used. Model choice may be made according to a trade-off between how well the model fits the data vs. the associated computational burden when applying the model in the algorithm.

Often, the distributions (and thus PDFs) differ among Bands. One Band may have a larger variance than another band. A first Band may have a larger covariance in one direction (e.g., y(1-2,k) than a second Band, but the second Band may have a larger covariance in another direction (e.g., y(2-3),k). This statistical information may be used to determine, for a newly "received" y(i,k), which Band most likely yielded the newly observed combustion event.

For example, FIG. 8 illustrates a hypothetical "new" observation y(i,new) 830. The PDF for each of the Bands may be used to calculate the probability density (of that Band) at the coordinates of y(i,new). The probability density from each Band's PDF may be the likelihood that y(i,new) belongs to the distribution of that particular Band. The PDF having the highest probability density at y(i,new) may be Band (e.g., the knock intensity) with which y(i,new) is most likely to be associated with. For each new combustion cycle (k), opsensor data may be used to calculate y(i,k), which may be associated with a Band, which identifies the knock intensity during that combustion cycle.

In some cases, a statistical distance (e.g., the Mahalanobis distance) from y(i,new) to each y(i,mean) may be calculated, and the smallest statistical distance may correspond to the Band to which y(i,new) is assigned. In some cases, multiple hypothesis testing and/or a log-likelihood approach may be used to choose a Band.

Figure 9:
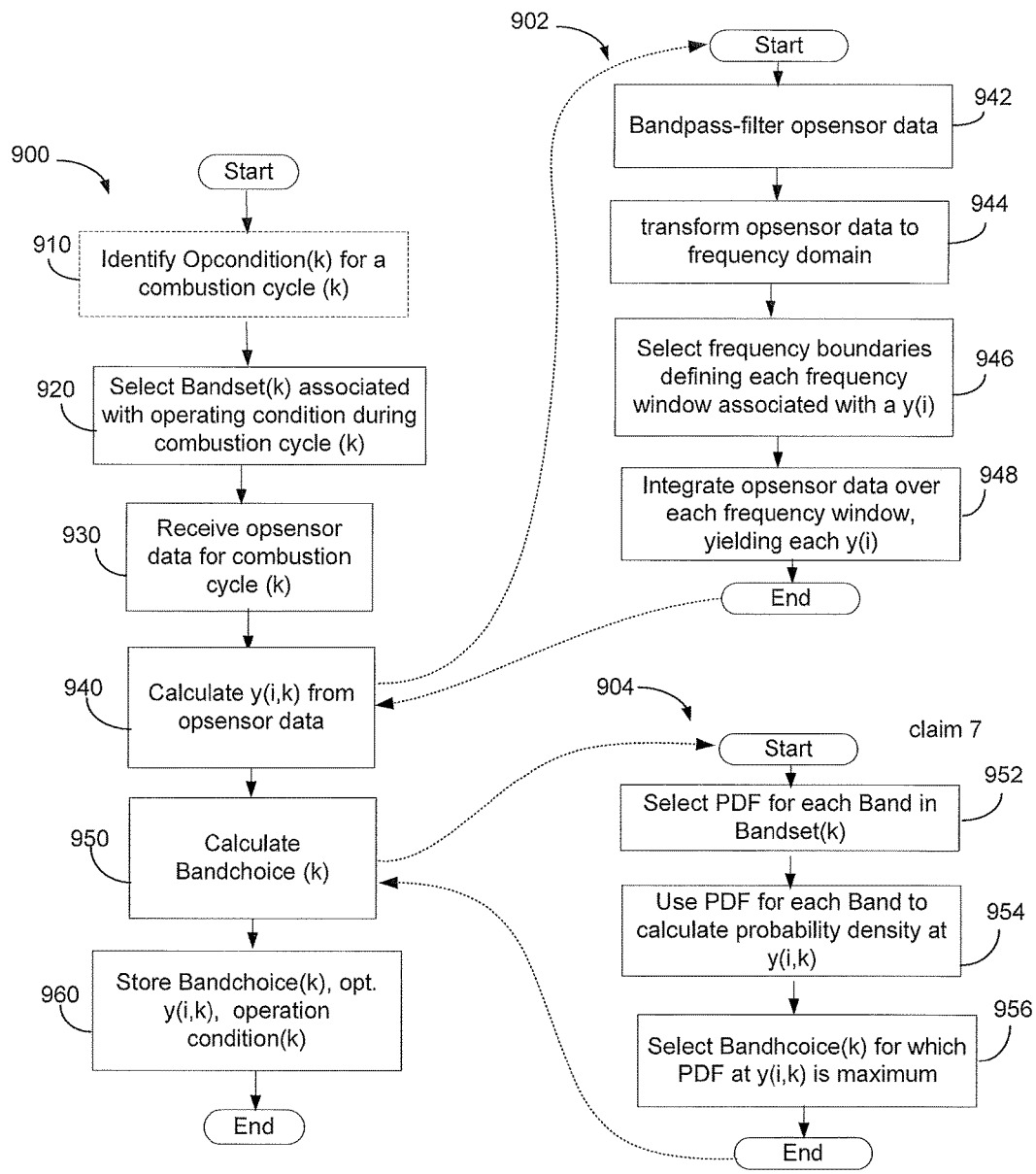
FIG. 9 illustrates a method for determining knock intensity, according to some embodiments.

FIG. 9 illustrates a method for calculating knock intensity, according to some embodiments. Method 900 may be used during operation (e.g., of a production engine 103) to determine a Bandchoice(k) associated with a given combustion cycle (k). Bandchoice(k) may be the Band most likely to have resulted in the y(i,k) from that combustion cycle, and so may be a proxy for r(k) (if a reference sensor were available).

In optional step 910, an opcondition(k) is identified. Opcondition(k) may be an engine operating condition during combustion cycle (k). In step 920, a bandset(k) is selected (e.g., based on opcondition(k)). Bandset(k) may be a set of Bands of knock intensity, each defining a magnitude or other aspect of knocking within the cylinder.

In step 930, opsensor data are received (e.g., from opsensor 140). In step 940, y(i,k) are calculated from the received opsensor data. In step 950, Bandchoice(k) is calculated. Bandchoice(k) may be the choice of which Band from bandset(k) that y(i,k) is assigned to, and may be a measure of the knock intensity during combustion cycle (k). In step 960, various data may be stored (e.g., Bandchoice(k), and optionally y(i,k)) and these data may be associated with opcondition(k). For a plurality of k=1, n combustion cycles, Bandchoice(k) may be the knock intensity calculated for each combustion cycle, based on data from opsensor 140.

Methods 902 and 904 provide additional information on certain embodiments. Some embodiments calculate y(i,k) using data in the time domain (e.g., by integrating between first and second times). Method 902 provides an exemplary method of calculating y(i,k) using signal processing that comprises transformation of a time-based signal into the frequency domain.

In step 942, opsensor data may be bandpass-filtered. In step 944, the bandpass-filtered data may be transformed to the frequency domain (e.g., using FFT). In step 946, frequency boundaries within the transformed data are selected (e.g., received from a database according to opcondition(k)). Each pair of boundaries may define a frequency window, which may become an overlap region. One frequency window may be selected (e.g., i=1). A plurality of n frequency windows may be selected. A larger number of windows may provide for improved accuracy. A smaller number of windows may reduce computational demands. The number of windows may be selected according to computational capabilities and information requirements.

In step 948, the transformed opsensor data may be integrated over each frequency window, generating a value for y(i,k) for each window (i) in that particular combustion cycle (k).

Some embodiments calculate bandchoice(k) using fitting (e.g., least squares, monte carlo, and the like). Method 904 provides an exemplary method of calculating bandchoice(k) using probability distribution functions. Method 900 may include one or both of methods 902 and 904; method 900 may include other methods for calculating y(i,k) and/or determining bandchoice(k).

In method 904, Bandchoice(k) may be calculated using PDF information. PDF information may be retrieved from a data storage (e.g., from prior operation of benchmark engine 101.

In step 952, a PDF is selected for each Band within the bandset(k) (e.g., received from a database, optionally according to opcondition(k)). For example, method 700 may be (or have been) used to generate PDFs. Some embodiments calculate y(i,k) using data in the time domain (e.g., by integrating between first and second times). In step 954, the PDF for each Band is used to calculate the probability density at the calculated y(i,k) (i.e., the combustion cycle being characterized). The probability density from each PDF may quantify the likelihood that (the PDF describing) a particular Band yielded the calculated y(i,k). In step 956, banchoice(k) is selected. Bandchoice(k) may be the Band (from bandset(k)) into which y(i,k) is categorized. Bandhoice(k) may be the Band whose PDF has the highest probability of having resulted in y(i,k).

The following examples describe select embodiments.

Example 1

The following example provides additional detail, using three knock indicators (i=1, m, where m=3):

$$y(k) = \begin{pmatrix} y(1,k) \\ y(2,k) \\ y(3,k) \end{pmatrix}. \tag{0.1}$$

In this example, y(i,k) may be assigned to one of three different knock intensity Bands, denoted by
Band(1)=No/low knock intensity
Band(2)=Medium knock intensity
Band(3)=High knock intensity.
Benchmark engine 101 may be used to generate data from N combustion cycles. Using reference measurements r(k) we select those r(k) that belong to Band(1), Band(2), and Band(3), each with its associated y(i,k) within that Band. In some cases, a normal distribution may be used for the PDF describing those y(i,k) associated with each Band. In such cases, the probability density may be given by $$p(y) = \frac{1}{(2\pi)^{\frac{m}{2}} \det^{\frac{1}{2}}(C_y)} \exp\left[-\frac{1}{2}(y-\bar{y})^T C_y^{-1} (y-\bar{y})\right] \tag{0.2}$$

where m=3 is the number of knock indications from each combustion cycle, 'det' denotes the determinant, $C_y$ is the covariance matrix of the knock indication vector y, $\bar{y}$ is the expected value of y (the center of the PDF) and 'exp' denotes the natural exponential. To compute each of PDF(Band1), PDF (Band2) and PDF(Band3) the unknown expected values $\bar{y}_\Phi$, $\bar{y}_\Gamma$, $\bar{y}_A$ and the covariance (multidimensional spread around the expected value) $C_\Phi$, $C_\Gamma$ and $C_A$ may be calculated (respectively). These parameters may be computed from the calibration data using the formulas $$\bar{y} = \frac{1}{N}\sum_{k=1}^{N} y(k) \tag{0.3}$$

and $$C_y = \frac{1}{N}\sum_{k=1}^{N} y(k)y^T(k).$$

During operation (e.g., with production engine 103) y(i,k) may be used to determine if, during combustion cycle (k), the engine was (for example) "not knocking," "lightly knocking" or "harshly knocking." The statistical distance, (e.g., the Mahalanobis distance) may be calculated, which may be an example of a "descriptive statistic" quantifying the relationship between the observations y(k) and the respective PDFs of Band(1), Band(2) and Band(3). This calculation may be done using the following formula $$D(k) = \sqrt{(y(k)-\bar{y})C_y^{-1}(y(k)-\bar{y})}. \tag{0.5}$$

For a newly observed combustion event, the PDF associated with the Band most likely to have yielded the observed knock may be calculated. For example, the PDF having the highest probability density at the coordinates of the newly observed knock intensity may be from the intensity Band most likely to have "resulted" that new observation. For example, a comparison of the distances D(k) (e.g., a Mahalanobis distances) from the coordinates of a newly observed knock intensity to those of each PDF (from each of the Bands in the Bandset) may be made, and the minimum distance (e.g., from newly observed y(i,k) to the mean y(i) for each PDF) may be associated with the intensity Band that most likely yielded the observed knock.

In some embodiments, algorithms may weight the indicators y(i,k) optimally with the inverse of the covariance matrix. A knock indicator which is more accurate and/or precise may be given more weight than one that is less accurate/precise. A descriptive statistic may be sensitive to both the magnitude of an observation y(k) and the direction to $\bar{y}$ in an m-dimensional space (e.g., cross correlation may be automatically taken care of). For example, even if some of the information in two features might be redundant, that redundancy may be compensated for when the features are weighted together. Various embodiments "span" or "map" or otherwise solve the problem in m-dimensional space instead of (as in conventional knock detection) using a threshold (in 1-dimensional space).

There may be additional advantages with processing the knock observations in m-dimensional space. For example, a disturbance in the knock indication measurements in ion sense measurements (e.g., capacitive discharges over the spark plug) may appear as a damped sinusoidal signal that appears randomly and with random amplitude. The frequency of such a disturbance often coincides with the knock ground frequency band (typically 6 kHz in automotive). Using traditional knock measurement techniques, such disturbances might erroneously be interpreted (when the ground knock frequency part of the signal is used). However, by spanning the problem formulation into a m-dimensional space (of several knock indicators) a disturbance would be expected to only trigger one of the m dimensions (e.g., the ground frequency, y(1,k)) whereas other dimensions (e.g., y(2,k), y(3,k), y(4,k), y(5,k) might be unaffected. When a knocking condition is actually present (and manifest in the m-dimensions), then ideally all m dimensions will be affected by the knock, and by using the disclosed method the knocking condition may be more accurately quantified.

Nuisance Signal Compensation

If knock indications are affected by a measurable nuisance signal, then the effect of the measured nuisance signal on the knock indication can be incorporated in the data models needed in the disclosed invention. For example, consider the case when ion sensing opsensors (for knock indicators) are used. The impulse response of an ion sense system may depend on the hardware in the ignition system (coils, cables etc.) through which the ion current is filtered before measured. The impulse response can in some cases be quite long (e.g., relative to the pressure dissipation time, or time after TDC). The knock indicators are typically computed from data in a knock window which opens and closes at specific crank axis positions and between which the ion current is measured. The response from a nuisance signal may ring into the knock window and corrupt the information related to knock. However, if the nuisance signal can be measured, the parameters of the statistical models that describe the knock intensity levels can be adjusted accordingly to generate modified models $M'_\Phi$, $M'_\Gamma$ and $M'_A$, respectively. By comparison to where normal distribution models were used, this would mean that the model parameters consisting of the mean values $\bar{y}_\Phi$, $\bar{y}_\Gamma$, $\bar{y}_A$ and the covariance $C_\Phi$, $C_\Gamma$ and $C_A$ would be adjusted accordingly. For example, a reproducible nuisance signal (e.g., ringing in the coil) could be captured in the model, and a first model (based on $C_\Phi$, $C_\Gamma$ and $C_A$) would be modified to become a second model (annotated $M'_\Phi$, $M'_\Gamma$ and $M'_A$) that is more robust against this nuisance signal. In some embodiments, a false or biased detection due to nuisance signals may be avoided and/or accommodated, and the reliability of the knock intensity measurement may be further improved.

Example 2

Figure 10:
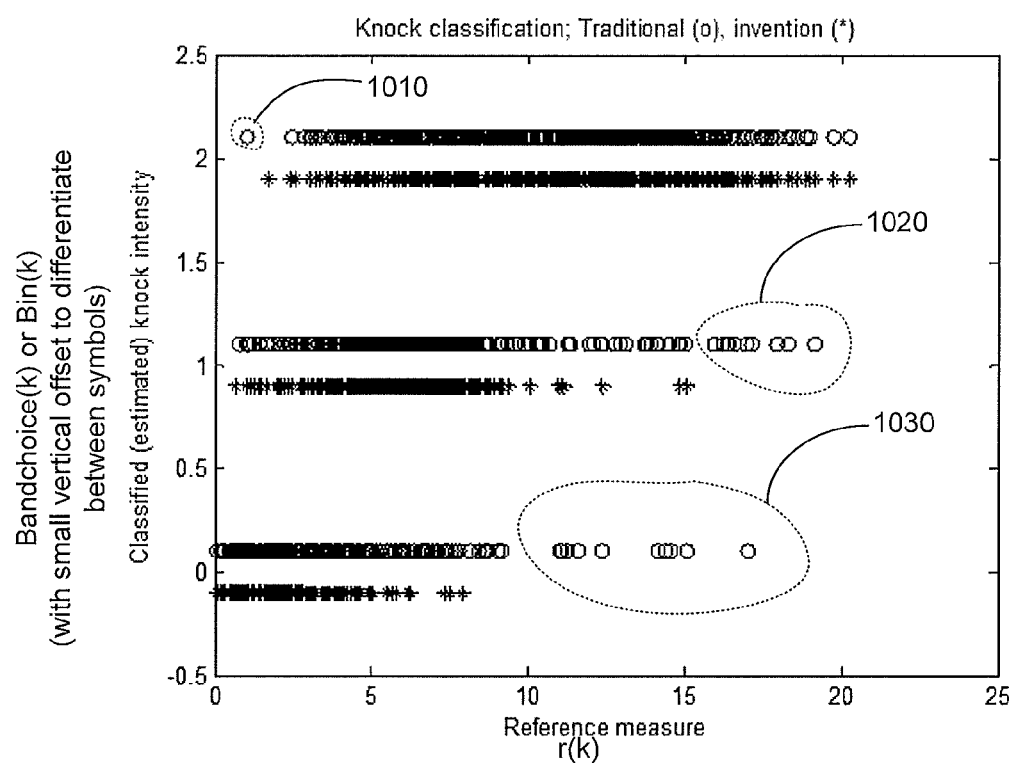
FIG. 10 illustrates a comparison between a traditional estimate of knock intensity and an improved estimate according to an embodiment.

FIG. 10 illustrates a comparison between a traditional estimate of knock intensity and an improved estimate according to an embodiment.

FIG. 10 compares the results of calculating "knock intensity" using traditional methods (o) to an improved method (x) described herein. Using the same set of knock indication data (both r(k) and y(i,k) for a plurality of synthetic combustion events (k)), a "traditional" knock intensity was determined by assigning the value of a single knock indicator y(1,k) to a knock intensity "bin" or "group" according to thresholds between groups 0, 1, and 2. Thus, using the traditional method, each combustion event was assigned as either being a "low" intensity (Bin=0), a "medium" intensity (Bin=1) or a "high" intensity (Bin=2). These points are shown as "o" symbols in FIG. 10.

For comparison with the results of the traditional method, an exemplary PDF-based calculation was performed, in which three different knock indicators y(1,k), y(2,k), and y(3,k) were used (e.g., based on different overlap regions between the opsensor and reference sensor). The y(i,k) and r(k) data were sorted, and a set of three different Bands of r(k) was determined. In this example, Band 0="low," Band 1="medium," and Band 2="high" knock intensity.

For each of these three Bands, the probability distribution functions for the respective y(i,k) within that Band were calculated. For each "newly measured" y(i,k) (shown in FIG. 10), the PDF associated with the Band most likely to have resulted in that y(i,k) was chosen, resulting in a Bandchoice(k) for each combustion cycle (k). In this example, Bandchoice (k) was the Band (0, 1, or 2) associated with the PDF having the highest probability density at a particular y(i,k).

To compare the "traditional" results with the new aspects described herein, FIG. 10 compares Bandchoice(k) to the traditional Bin(k) for the same set of combustion cycles(k). For clarity, the values are vertically offset by a small amount (0.1) to facilitate viewing these data on the same graph. For example, for Bandchoice(k)=Bin(k)=2, the Bin(k) data are plotted (on the y-axis) at 2.1 and Bandchoice(k) data are plotted at 1.9.

As shown in FIG. 10, the determination of knock intensity using Bandchoice provided improved accuracy as compared to traditional methods. In region 1010, a combustion event characterized (by the reference sensor) as having a low knock intensity is noted. The traditional "single indicator" method characterized this combustion event as having high knock intensity (Bin=2), whereas this event should have been characterized as having a low knock intensity (e.g., 0 or 1 on the y-axis, per the low value of the reference sensor). In contrast to the traditional measurement, this particular combustion event was not incorrectly characterized using the Bandchoice-based calculation (i.e., the new method did not put this combustion into the highest intensity Bandchoice=2; it was characterized as lower intensity).

When operating an engine (that generated the combustion event shown in region 1010) and adjusting operation in response to (opsensor-based) knocking, the traditional method (incorrectly sensing high intensity knocking) may have caused a "detuning" of the engine to reduce performance, even though (according to the reference sensor) the engine was not knocking (and thus should not be detuned). Whereas the traditional measurement might have caused erroneous de-tuning, the improved measurement would likely not have caused erroneous detuning (because of the agreement between the Bandchoice and the reference sensor).

Similar improvements are evident at high knock intensities (as measured by the reference sensor). In region 1020, several combustion events associated with high intensity knocking (e.g., above 15 per the reference sensor) were characterized by the traditional method as being in the mid-intensity (Bin=1). In contrast, the Bandchoice method characterized these events at the highest knock intensity (Bandchoice=2).

In region 1030, several combustions having relatively high knock intensity (e.g., above 10 according to the reference sensor) are noted. For this region, the traditional "single indicator" method characterized these combustion events as "low intensity" (Bin=0), even though these events were characterized by the reference sensor as relatively high intensity (i.e., greater than 10 on the x-axis). In this situation, the "traditional" method did not detect high knock intensities, and so continued operation of the engine under these conditions (i.e., continuing to generate high knock intensities) could cause damage.

By comparison, the Bandchoice-based calculation of "knock intensity" did not mischaracterize these events. The combustion events in region 1030 (characterized as Bin=0 by the traditional method) were characterized as either Bandchoice=1 (mid) or Bandchoice=2 (high) by the Bandchoice method. An engine operated using the Bandchoice-based method, having been identified as having these high knock intensities, could be detuned to reduce knocking and prevent damage to the engine.

As such, FIG. 10 graphically illustrates improvements in sensing "low intensity knocks" that would have traditionally (and erroneously) been measured as "high intensity." FIG. 10 also illustrates improvements in sensing "high intensity knocks" that would have traditionally (and erroneously) been measured as "low intensity." In some embodiments, systems and methods disclosed herein improve correlation with the reference sensor with respect to "false positives" and/or "false negatives."

The following matrices quantify the improvements in knock intensity sensing (as compared to a traditional single-measurement value, characterized according to thresholds as being 0, 1, or 2). The "layout" of each matrix is presented as follows:

| | | |
|---|---|---|
| Estimated knock = 2 | Estimated knock = 2 | Estimated knock = 2 |
| Reference knock = 0 | Reference knock = 1 | Reference knock = 2 |
| Estimated knock = 1 | Estimated knock = 1 | Estimated knock = 1 |

| Reference knock = 0 | Reference knock = 1 | Reference knock = 2 |
| Estimated knock = 0 | Estimated knock = 0 | Estimated knock = 0 |
| Reference knock = 0 | Reference knock = 1 | Reference knock = 2 |

Matrix 1 (above) may be used as a "legend" to interpret the matrices below.

In each box within a matrix below, the value represents the accuracy with which a particular measurement method (based on opsensor data) agreed with its respective reference sensor measurement. For example, in the upper left corner (Estimated knock=2, Reference knock=0), the value in this box is the number of times (e.g., in a set of 100 measurements) that the opsensor-based measurement returned a knock intensity of 2 while the reference sensor returned knock intensity of 0.

Ideally, the correlation between the opsensor-based measurement and reference sensor should be represented as follows:

| Matrix 2 | | |
| --- | --- | --- |
| 0 | 0 | 100 |
| 0 | 100 | 0 |
| 100 | 0 | 0 |

For "perfect" agreement between the opsensor-based knock intensity and the reference knock intensity, all combustion events for which the reference knock intensity=0 should also have an opsensor-based knock intensity (either Bin(k) or Bandchoice(k))=0. Similarly, when the reference knock intensity=1, the opsensor-based knock intensity should be 1, and when the reference knock intensity is 2, the opsensor-based knock intensity should be 2. By extension, there (ideally) should be no "incorrectly" characterized combustion events (and so values for cells off the anti-diagonal should be 0).

The following matrix shows an actual comparison (between opsensor and reference data) for the "traditional" method (for those data shown graphically in FIG. 10):

| Matrix 3 | | |
| --- | --- | --- |
| 2 | 23 | 75 |
| 10 | 58 | 32 |
| 56 | 34 | 10 |

The following table shows an actual comparison (between opsensor and reference data) for the same combustion events using the Bandchoice-based calculation according to an embodiment:

| Matrix 4 | | |
| --- | --- | --- |
| 2 | 17 | 82 |
| 10 | 72 | 18 |
| 80 | 19 | 1 |

Comparing matrix 3 (old way) to matrix 4 (new way), the Bandchoice-based method was generally more accurate than the traditional method. For example, at the lowest (reference) knock intensity, the traditional method characterized 56% of the "low intensity" combustion events as "low" (Bin=0), whereas the Bandchoice-based method characterized 80% of these events as "low" (Bandchoice=0). Similarly, the traditional method correctly characterized 58% of the "medium" intensity knocking events, whereas the Bandchoice-based method correctly characterized 72% of these events. The traditional method correctly characterized 75% of the "high" intensity knocking events, while the Bandchoice-based method correctly characterized 82% of these events.

Similarly, the Bandchoice-based method generally improved the "mis-characterization" of events. On the off-diagonal locations (that ideally=0, per Matrix 2) the Bandchoice-based method typically yielded lower values (i.e., closer to 0) than the traditional method.

Matrices 5 and 6 below quantify the difference between the Bandchoice-based method and the traditional method. Matrix 5 shows the magnitude of the actual improvement (i.e., as a positive number) from using the Bandchoice-based method as compared to the traditional method (i.e., the magnitude of the difference, cell by cell, between matrix 4 and matrix 3):

| Matrix 5 | | |
| --- | --- | --- |
| 0 | 6 | 7 |
| 0 | 14 | 14 |
| 24 | 15 | 8 |

Matrix 6 shows the data from Matrix 5, normalized to the value of the traditional measurement (i.e., cell by cell to Matrix 3). As such, Matrix 6 may represent the relative improvement of the Bandchoice method over the traditional method:

| Matrix 6 | | |
| --- | --- | --- |
| 21% | 26% | 9% |
| −1% | 24% | 44% |
| 43% | 44% | 87% |

In general, the Bandchoice method was consistently better than the traditional method (although for this set of data, there was a slight decrease for combustion events in which the reference knock intensity=0 but the opsensor knock intensity=1, which was only manifest in Matrix 6 for these rounded results).

Additional granularity (e.g., the use of 4, 5, 6, 7, or even more bands) may further improve measurements. In some embodiments, a "diminishing marginal return" is calculated, in which the marginal improvement (in accuracy of estimating the reference) is calculated for each additional band. The decision on whether or not to add a "new" band may be predicated on the newly added band actually improving the estimate of the reference sensor. A preferred number of bands may be limited to those bands whose addition to the Bandset improve the estimate of the reference sensor by a meaningful amount (e.g., an amount to justify the added computational cost of adding this additional Band to the Bandset).

What is claimed is:

1. A system configured to measure knock intensity in an engine, the system comprising:
   an opsensor configured to sense knocking within a cylinder of the engine during a combustion cycle (k); and
   a computing platform comprising computing hardware and software, the platform configured to communicate with the opsensor and an engine control system configured to operate the engine, the platform further configured to:
select a bandset(k) associated with the combustion cycle (k), the bandset(k) comprising two or more bands of knock intensity, each band of knock intensity comprising:
an identifier describing an intensity or magnitude of knocking within the band; and
a probability density function describing an expected statistical distribution of values for a knock indicator y(i) within the band;
receive opsensor data from the opsensor for the combustion cycle (k);
calculate a new knock indicator y(i,k) from the received opsensor data, the new knock indicator y(i,k) comprising (i) values for each combustion cycle (k);
identify, using the two or more probability density functions, the band in the bandset(k) that is most likely to have yielded the new knock indicator y(i,k);
define a bandchoice(k) for the combustion cycle (k) according to the identifier of the band that is most likely to have yielded the new knock indicator y(i,k); and
store the bandchoice(k) for the combustion cycle (k).

2. The system of claim 1, wherein the opsensor comprises:
a spark-plug ignition device configured to ignite combustion in the cylinder; and
an acoustic sensor.

3. The system of claim 1, wherein the opsensor comprises two or more opsensors sensing the same cylinder, a first opsensor inside the cylinder and a second opsensor outside the cylinder.

4. The system of claim 1, wherein the band in the handset (k) that is most likely to have yielded the new knock indicator y(i,k) includes the band whose probability density function yields the highest probability density at y(i,k).

5. The system of claim 1, wherein:
the new knock indicator y(i,k) comprises at least two knock indicators y(i,k) for each combustion cycle (k); and
the probability density function of a first band has a larger covariance in a dimension of values of at least one knock indicator y(i) than the probability density function of a second band.

6. The system of claim 1, wherein:
the opsensor comprises a plurality of opsensors (140) located at different locations outside the cylinder; and
the new knock indicator y(i,k) for each combustion cycle (k) comprises a first knock indicator y(1,k) from a first opsensor of the plurality and a second knock indicator y(2,k) from a second opsensor of the plurality.

7. The system of claim 1, wherein the bandset(k) comprises three or more bands of knock intensity, each band including a corresponding identifier and probability density function.

8. An apparatus comprising:
an engine having at least one cylinder configured to combust a fuel in a combustion cycle (k); and
the system according to claim 1, wherein:
the opsensor is configured to sense knocking within the at least one cylinder of the engine;
the opsensor comprises a plurality of opsensors in different locations; and
the new knock indicator y(i,k) for each combustion cycle (k) comprises:
a first knock indicator y(1,k) from a first opsensor of the plurality of opsensors, and
a second knock indicator y(2,k) from a second opsensor of the plurality of opsensors.

9. An apparatus for calculating a probability density function of knock intensities, the apparatus comprising:
a engine having at least one cylinder configured to combust a fuel/air mixture within the cylinder;
a reference sensor configured to measure knocking within the cylinder during a combustion cycle (k);
an opsensor configured to measure one or more knock indicators during the combustion cycle (k); and
a system in communication with the reference sensor and opsensor, the system comprising a computer readable, non transitory storage medium coupled to a processor, the medium having embodied thereon instructions executable by the processor to perform a method comprising:
operating the engine over a plurality of combustion cycles sufficient to generate a range of knock intensities within the cylinder;
receiving, for at least some of the combustion cycles, reference data from the reference sensor and opsensor data from the opsensor, the data associated with knock intensities in the combustion cycles;
calculating, for one or more of the combustion cycles, a reference knock intensity r(k) from the reference data and a knock indicator y(i,k) from the opsensor data;
creating an array of knock intensity data, the array comprising at least r(k) and y(i,k) for each of the combustion cycles;
selecting at least two bands of knock intensity from the array, each band comprising a subset of combustion cycles for which r(k) of that combustion cycle is between an upper limit of r(k) and a lower limit of r(k) defining that band;
calculating a probability density function (PDF) of the y(i,k) within each of the selected bands, each probability density function describing a statistical distribution of the values of y(i,k) within that band; and
storing a bandset comprising the calculated probability density functions.

10. The apparatus of claim 1, wherein each band of knock intensity corresponds to a set of knock intensities that differ from those in another band.

11. The apparatus of claim 9, wherein at least two bands includes at least three bands, and at least one band includes greater than 100 combustion cycles.

12. The apparatus of claim 9, wherein calculating y(i,k) comprises, for at least some of the combustion cycles (k):
receiving reference data from the reference sensor;
receiving opsensor data from the opsensor;
identifying one or more overlap regions (i) between the reference data and the opsensor data; and
assigning a knock indicator y(i,k) to each overlap region (i).

13. The apparatus of claim 12, wherein identifying the one or more overlap regions comprises:
bandpass-filtering the opsensor data and reference data;
transforming the filtered data to a frequency domain;
identifying boundaries for one or more frequency windows within which the transformed opsensor data correlate with the transformed reference data; and
associating an overlap region with each frequency window.

14. A computer-implemented method for measuring knock intensity in an engine comprising a cylinder and an opsensor configured to measure knocking within the cylinder during a combustion cycle (k), the method comprising:
- selecting a bandset(k) associated with the combustion cycle (k), the bandset(k) comprising two or more bands of knock intensity, each band of knock intensity comprising:
  - an identifier describing an intensity or magnitude of knocking within the band; and
  - a probability density function describing an expected statistical distribution of values for a knock indicator y(i) within the band;
- receiving opsensor data from the opsensor for the combustion cycle (k);
- calculating one or more new knock indicators y(i,k) from the received opsensor data;
- calculating, using the two or more probability density functions, a bandchoice(k), the bandchoice(k) identifying the band in the bandset(k) that is most likely to have resulted in the new knock indicator y(i,k); and
- storing the bandchoice(k) for the combustion cycle (k).

15. The system of claim 1, wherein the opsensor comprises:
- an acoustic sensor external to the cylinder; and
- an ion sensor disposed within the cylinder; and
- the new knock indicator y(i,k) comprises a first new knock indicator y(1,k) from the acoustic sensor and a second new knock indicator y(2,k) from the ion sensor.

16. The system of claim 1, wherein the opsensor comprises a pressure sensor configured to measure a pressure within the cylinder.

17. The system of claim 1, wherein the opsensor comprises an ion sensor configured to measure an ion current between electrodes disposed within the cylinder.

18. A truck comprising:
- an engine having a plurality of cylinders configure to combust a fuel in a combustion cycle (k); and
- the system of claim 1 coupled to the engine.

19. The truck of claim 18, wherein:
- the opsensor comprises:
  - an ion sensor; and
  - an acoustic sensor disposed outside at least one cylinder; and
- the new knock indicator y(i,k) comprises a first new knock indicator y(1,k) from the ion sensor and a second new knock indicator y(2,k) from the acoustic sensor.

20. The system of claim 7, wherein the two or more probability density functions are calculated using an apparatus according to claim 9.

* * * * *